US008698877B2

(12) United States Patent
Tadokoro et al.

(10) Patent No.: US 8,698,877 B2
(45) Date of Patent: Apr. 15, 2014

(54) IMAGE INFORMATION PROCESSING APPARATUS, IMAGE CAPTURE APPARATUS, IMAGE INFORMATION PROCESSING METHOD, AND PROGRAM

(75) Inventors: Eiji Tadokoro, Chiba (JP); Shunji Okada, Kanagawa (JP)

(73) Assignee: Sony Corporation, Tokyo (JP)

( * ) Notice: Subject to any disclaimer, the term of this patent is extended or adjusted under 35 U.S.C. 154(b) by 297 days.

(21) Appl. No.: 12/997,968

(22) PCT Filed: Apr. 22, 2010

(86) PCT No.: PCT/JP2010/057124
§ 371 (c)(1),
(2), (4) Date: Dec. 14, 2010

(87) PCT Pub. No.: WO2010/123053
PCT Pub. Date: Oct. 28, 2010

(65) Prior Publication Data
US 2011/0261160 A1    Oct. 27, 2011

(30) Foreign Application Priority Data
Apr. 24, 2009   (JP) ................................. 2009-105755

(51) Int. Cl.
*H04N 13/02*    (2006.01)
(52) U.S. Cl.
USPC ........................................................ 348/46
(58) Field of Classification Search
None
See application file for complete search history.

(56) References Cited

U.S. PATENT DOCUMENTS

| | | | |
|---|---|---|---|
| 4,354,751 A * | 10/1982 | Izumi et al. ..................... | 396/61 |
| 5,323,204 A * | 6/1994 | Wheeler et al. ................. | 396/60 |
| 6,111,597 A | 8/2000 | Tabata | |
| 6,443,842 B1 * | 9/2002 | Totsuka .......................... | 463/31 |
| 6,597,867 B2 * | 7/2003 | Nakahara ....................... | 396/104 |
| 8,006,186 B2 * | 8/2011 | Kellock et al. ................. | 715/728 |
| 8,044,997 B2 * | 10/2011 | Masuda et al. .................. | 348/51 |
| 8,073,243 B2 * | 12/2011 | Mareachen et al. ........... | 382/154 |
| 2008/0247670 A1 * | 10/2008 | Tam et al. ...................... | 382/298 |
| 2009/0195641 A1 * | 8/2009 | Neuman ......................... | 348/47 |
| 2009/0244268 A1 | 10/2009 | Masuda et al. | |
| 2011/0211045 A1 * | 9/2011 | Bollano et al. ................. | 348/46 |

FOREIGN PATENT DOCUMENTS

| JP | 64-024693 A | | 1/1989 |
|---|---|---|---|
| JP | 10 40420 | | 2/1998 |
| JP | 10040420 A | * | 2/1998 |
| JP | 10 188034 | | 7/1998 |

(Continued)

OTHER PUBLICATIONS

Office Action issued Aug. 6, 2013 in Japanese Patent Application No. 2009-105755.

(Continued)

*Primary Examiner* — Dave Czekaj
*Assistant Examiner* — Tyler W Sullivan
(74) *Attorney, Agent, or Firm* — Oblon, Spivak, McClelland, Maier & Neustadt, L.L.P.

(57) ABSTRACT

An image information processing apparatus is provided. The information processing apparatus includes a scene change detection unit that detects a scene change in content. The information processing apparatus also includes a depth value correction unit that corrects a depth value for stereoscopic display so as to allow a change of the depth value to transition at a predetermined display speed before and after the scene change.

19 Claims, 19 Drawing Sheets

(56) References Cited

FOREIGN PATENT DOCUMENTS

| JP | 11 164328 | 6/1999 |
| JP | 2004 246725 | 9/2004 |
| JP | 2008-005203 A | 1/2008 |
| JP | 2009 239388 | 10/2009 |

OTHER PUBLICATIONS

International Search Report issued Jul. 20, 2010 in PCT/JP10/057124 filed Apr. 22, 2010.

* cited by examiner

| DISTANCE [m] | DEPTH VALUE |
|---|---|
| 0.5 | 255 |
| 0.6 | 237 |
| 0.7 | 220 |
| 0.8 | 205 |
| 0.9 | 192 |
| 1.0 | 180 |
| 1.5 | 135 |
| 2.0 | 100 |
| 2.5 | 78 |
| 3.0 | 58 |
| 3.5 | 40 |
| 4.0 | 25 |
| 4.5 | 12 |
| 5.0 | 0 |

(a)

(b)

IMAGE INFORMATION PROCESSING APPARATUS, IMAGE CAPTURE APPARATUS, IMAGE INFORMATION PROCESSING METHOD, AND PROGRAM

TECHNICAL FIELD

The present invention relates to an image information processing apparatus, and, more specifically, relates to an image information processing apparatus that handles image information including a depth value for stereoscopic display, an image capture apparatus, a processing method for the apparatuses, and a program for causing a computer to execute the method.

BACKGROUND ART

In recent years, as display apparatuses for displaying content, display apparatuses capable of displaying not only planar (two-dimensional) content but also displaying stereoscopic (three-dimensional) content have been proposed. Because of the use of parallax (disparity) that occurs between both eyes, such display apparatuses may give an unnatural feeling to the viewer in cases such as a case where inconsistency occurs between the angle of convergence between both eyes and the focal length and a case where the value of parallax is not appropriate.

Therefore, a display apparatus that calculates the degree of influence of stereoscopic content on a living body and that controls the display state of stereoscopic content to be displayed in accordance with the resistance level of the viewer has been proposed (see, for example, PTL 1). In this related art apparatus, content meta-information contains depth map information about content, and, if its maximum amount of depth is large, the value of the depth map is changed so as to be smaller than a standard value, and display is performed.

CITATION LIST

Patent Literature

PTL 1: Japanese Unexamined Patent Application Publication No. 2004-246725 (FIG. 1 of PTL 1, in particular)

SUMMARY OF INVENTION

Technical Problem

The related art apparatus described above adjusts the amount of depth to suppress the influence on the viewer. In this related art apparatus, however, display is changed based on a general relationship (the risk of so-called cybersickness) between the resistance level of the viewer and stereoscopic content, and no consideration is given to the transition of content over time.

Stereoscopic content generally includes a scene change, and a depth value may rapidly change on the occasion of the change which may give an uncomfortable feeling to the viewer. This also becomes serious, likewise, not only in the change between stereo video images in stereoscopic content but also in the change between a stereo video image and a planar video image. Furthermore, a similar problem to that with moving images arises even in a case where a slideshow of still images is displayed.

The present invention has been made in view of such a situation, and is intended to allow a depth value to smoothly transition during scene changes of stereoscopic content.

Solution to Problem

The present invention has been made in order to solve the above problems, and its first aspect provides an image information processing apparatus including a scene change detection unit that detects a scene change in content, and a depth value correction unit that corrects a depth value for stereoscopic display so as to allow a change of the depth value to transition at a predetermined display speed before and after the scene change, and an image information processing method and program therefor. Thus, the effect of allowing a depth value for stereoscopic display to smoothly transition before and after a scene change is provided.

Furthermore, in this first aspect, the depth value correction unit may correct a depth value corresponding to a certain area in the content so as to allow a change of the depth value to transition at a predetermined display speed before and after the scene change. Thus, the effect of allowing a depth value corresponding to a certain area in content to smoothly transition before and after a scene change is provided.

Furthermore, in this first aspect, the depth value correction unit may correct a depth value of an entire image to a telephoto side before and after the scene change. Thus, the effect of allowing a depth value of an entire image to a telephoto side to transition before and after a scene change is provided.

Furthermore, in this first aspect, the depth value correction unit may correct the depth value so as to provide a transition from a depth value before the scene change to a depth value after the scene change at a predetermined display speed. Thus, the effect of allowing a smooth transition from a depth value before a scene change to a depth value after the scene change is provided.

Furthermore, in this first aspect, the depth value correction unit may allow a depth value to transition in one of a predetermined period before the scene change, a predetermined period after the scene change, and a predetermined period over before and after the scene change.

Furthermore, in this first aspect, the scene change detection unit may detect, as the scene change, a change between a stereoscopic image and a planar image. Thus, the effect of allowing a smooth transition before and after a change between a stereoscopic image and a planar image is provided.

Furthermore, in this first aspect, the scene change detection unit may detect, as the scene change, a change between a moving image and a still image. Thus, the effect of allowing a smooth transition before and after a change between a moving image and a still image is provided.

Furthermore, a second aspect of the present invention provides an image information processing apparatus including a fixed depth value setting unit that sets a constant value as a fixed depth value for a depth value for providing stereoscopic display of image data forming content, a reference depth value specifying unit that selects a certain area in the image data and that specifies, as a reference depth value, a depth value corresponding to the area, and a depth value correction unit that corrects a depth value corresponding to each area of the image data using a ratio of the reference depth value to the fixed depth value, and an image information processing method and program therefor. Thus, the effect of maintaining a depth value of a specific area at a constant value is provided.

Furthermore, a third aspect of the present invention provides an image capture apparatus including a captured-image supply unit that captures an image and that supplies the captured image and a depth value for stereoscopic display, a scene change detection unit that detects a scene change in the captured image, and a depth value correction unit that corrects the depth value so as to allow a change of the depth value to transition at a predetermined display speed before and after the scene change, and an image capture processing method and program therefor. Thus, the effect of allowing a depth value for stereoscopic display to smoothly transition before and after a scene change is provided.

Advantageous Effects of Invention

According to the present invention, an excellent advantage of enabling a depth value to smoothly transition in a scene change of stereoscopic content is achievable.

DESCRIPTION OF EMBODIMENTS

Modes for carrying out the present invention (hereinafter referred to as embodiments) will be described hereinafter.
The description will be given in the following order:
1. First Embodiment (an example in which a depth value is set to the telephoto side on the occasion of a scene change)
2. Second Embodiment (an example in which a depth value of a main image area is allowed to transition on the occasion of a scene change)
3. Embodiment (an example in which a depth value is corrected on the occasion of the change between slideshow still images)
4. Exemplary Modification 1. First Embodiment Example Overall Configuration of Image Capture Apparatus 300

Figure 1:
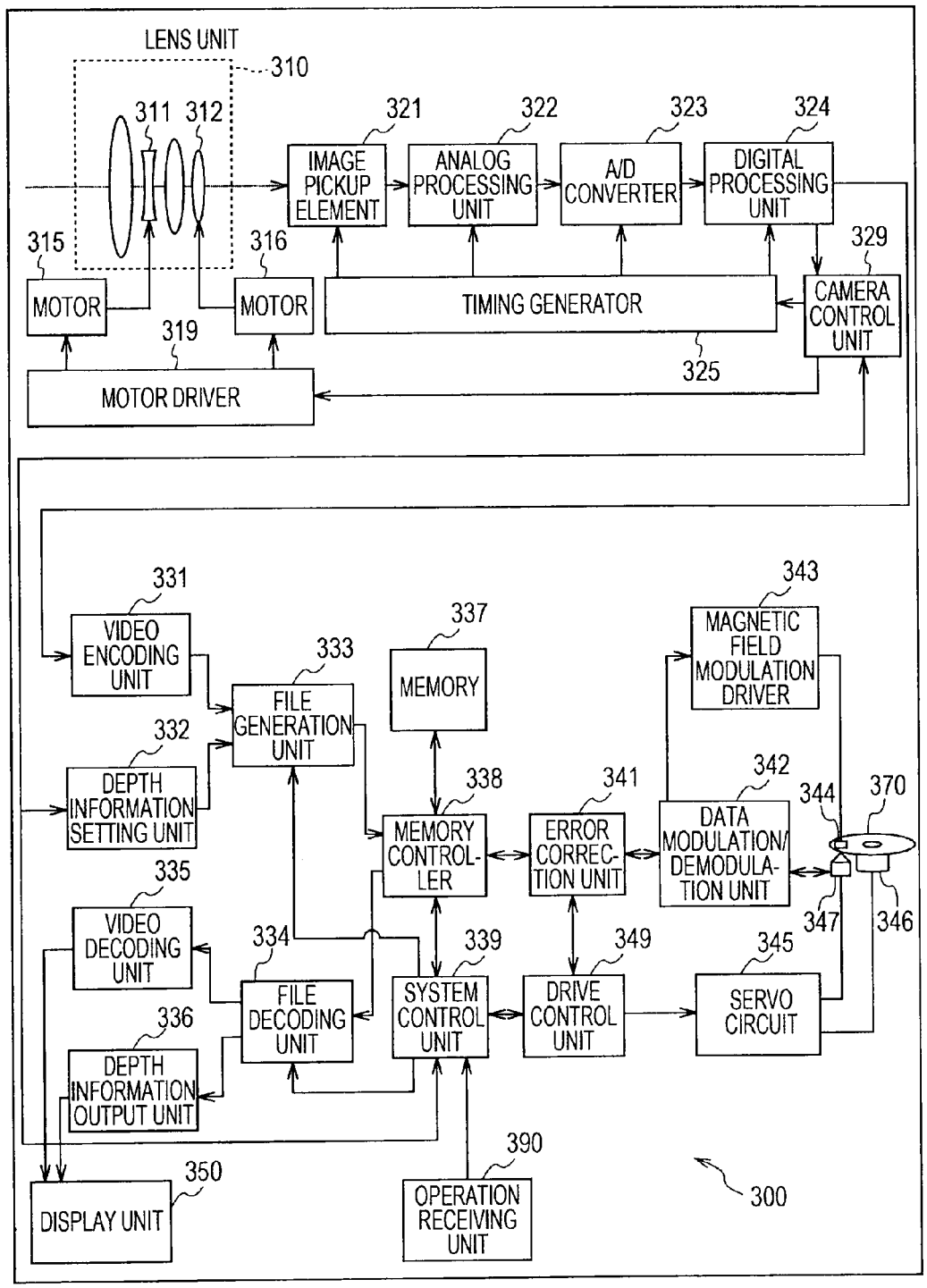
FIG. 1 is a diagram illustrating an example overall configuration of an image capture apparatus 300 in an embodiment of the present invention.

FIG. 1 is a diagram illustrating an example overall configuration of an image capture apparatus 300 in an embodiment of the present invention. The image capture apparatus 300 includes a lens unit 310, motors 315 and 316 used for the operation of the lens unit 310, and a motor driver 319. The image capture apparatus 300 further includes an image pickup element 321, an analog processing unit 322, an A/D converter 323, a digital processing unit 324, a timing generator 325 that generates the timings thereof, and a camera control unit 329. The image capture apparatus 300 further includes a video encoding unit 331, a depth information setting unit 332, a file generation unit 333, a file decoding unit 334, a video decoding unit 335, and a depth information output unit 336. The image capture apparatus 300 further includes a memory 337, a memory controller 338 therefor, and a system control unit 339. A signal line from an operation receiving unit 390 is connected to the system control unit 339. In addition, the image capture apparatus 300 includes an error correction unit 341, a data modulation/demodulation unit 342, a magnetic field modulation driver 343, a magnetic field head 344, a servo circuit 345, a motor 346, an optical pickup 347, a drive control unit 349, and a display unit 350. Furthermore, as a recording medium having video recorded thereon, for example, an optical disc 370 is attached to the image capture apparatus 300.

The lens unit 310 is configured to receive light from an object, and includes a zoom lens 311 and a focus lens 312. The motors 315 and 316 are connected to the zoom lens 311 and the focus lens 312, respectively, and the motors 315 and 316 are driven so that the zoom lens 311 and the focus lens 312 can be moved. Furthermore, the motor driver 319 is connected to the motors 315 and 316, and the motors 315 and 316 are controlled by the motor driver 319.

The image pickup element 321 is an element that converts light received by the lens unit 310 into static electricity and that accumulates static electricity, and is implemented using, for example, a CCD or CMOS sensor or the like. The analog processing unit 322 removes noise in an analog signal from the image pickup element 321 by using correlated double sampling (CDS), and corrects the high- and low-frequency portions of the analog signal by using automatic gain control (AGC). The A/D converter 323 converts the analog signal from the analog processing unit 322 into a digital signal. The digital processing unit 324 performs processing such as white balance or gamma conversion.

The output signal from the digital processing unit 324 becomes the video signal input of the video encoding unit 331. Furthermore, the information detected by the digital processing unit 324 is transferred to the camera control unit 329. The camera control unit 329 performs control on the motor driver 319 and the timing generator 325 on the basis of the information detected by the digital processing unit 324. The timing generator 325 generates timing signals for the image pickup element 321, the analog processing unit 322, the A/D converter 323, and the digital processing unit 324. It is to be noted that the lens unit 310, the image pickup element 321, etc., which have been described, are examples of a captured-image supply unit recited in the claims.

The video encoding unit 331 encodes a video signal. The depth information setting unit 332 sets depth information corresponding to the video signal. The file generation unit 333 generates a video file (multiplexed data) by multiplexing the encoded video signal and the depth information. The file decoding unit 334 decodes a video file and outputs a video signal and depth information. The video decoding unit 335 decodes the video signal and outputs the decoded video signal to the display unit 350. The depth information output unit 336 decodes the depth information and outputs the decoded depth information to the display unit 350.

The memory 337 is a memory that holds a video file and the like. The memory controller 338 writes a video file (multiplexed data) supplied from the file generation unit 333 or the error correction unit 341 into the memory 337, or furthermore, reads multiplexed data from the memory 337 and supplies the multiplexed data to the error correction unit 341 or the file decoding unit 334.

The system control unit 339 controls the operation of the memory controller 338 or the operation of the file generation unit 333 and the file decoding unit 334 as described above. Furthermore, the system control unit 339 is connected to the drive control unit 349 and makes a request for the operation of a disk drive. Furthermore, the system control unit 339 is connected to the camera control unit 329, and can obtain the autofocus and zoom state, such as whether the autofocus is in focusing action or not or the focal length.

In addition, the operation receiving unit 390 is connected to the system control unit 339, and an operation input from the user can be recognized. As the operation receiving unit 390, for example, buttons relating to zoom and buttons relating to recording are provided. The system control unit 339 is connected to the camera control unit 329, and control such as zoom is performed in accordance with an operation input from a user.

The error correction unit 341 adds a code for interleaving and error correction to the multiplexed data from the memory controller 338, and supplies the resulting data to the data modulation/demodulation unit 342. Furthermore, the error correction unit 341 performs deinterleaving and error correction processing on a demodulated signal from the data modulation/demodulation unit 342, and supplies multiplexed data to the memory controller 338.

The data modulation/demodulation unit 342 performs predetermined modulation for recording onto the optical disc 370, and thereafter outputs the resulting signal to the magnetic field modulation driver 343. At the same time, the data modulation/demodulation unit 342 outputs a signal for driving the optical pickup 347. Furthermore, the data modulation/demodulation unit 342 performs predetermined demodulation processing on a signal from the optical pickup 347, and outputs the resulting signal as a demodulated signal to the error correction unit 341.

At the time of recording, the magnetic field modulation driver 343 drives the magnetic field head 344 in accordance with an input signal, and applies a magnetic field to the optical disc 370. At the time of recording, the optical pickup 347 radiates a laser beam for recording onto the optical disc 370 to record a signal onto the optical disc 370. Furthermore, at the time of reproduction, the optical pickup 347 radiates a laser beam for reproduction onto the optical disc 370, performs photoelectric conversion from the amount of beam reflected from the optical disc 370 into an electrical signal, and acquires a reproduction signal. The above operations are performed in accordance with a request from the system control unit 339, and the drive control unit 349 issues a request to the servo circuit 345 to control the overall operation of the disk drive. The servo circuit 345 controls the movement servo in the disk radial direction, tracking servo, and focus servo of the optical pickup 347, and further controls the spindle servo of the motor 346. Thus, the optical disc 370 performs recording or reproduction of a video file (multiplexed data).

It is to be noted that in the example configuration described above, a magneto-optical disk for magnetic field modulation is assumed. However, a similar basic configuration is used even in the case of a phase change disk. Furthermore, in place of the optical disc 370, a magnetic disk such as a hard disk or a semiconductor disk such as an SSD (Solid State Drive) may be utilized.

The display unit 350 is configured to display a stereoscopic image using parallax that occurs between both eyes on the basis of a video signal from the video decoding unit 335 and depth information from the depth information output unit 336. The scheme by which the display unit 350 performs stereoscopic display is not particularly limited, and the display unit 350 is implemented by, for example, a micropole-type display. Furthermore, here, a display unit that performs stereoscopic display based on a video signal and depth information is assumed. However, this is not intended in a limiting sense. In general, it is possible to convert depth information into a left/right parallax offset value, and therefore the application to a display unit of the left/right parallax type (side-by-side type) is also possible.

[Example Configuration of Content Recording Unit 200]

Figure 2:
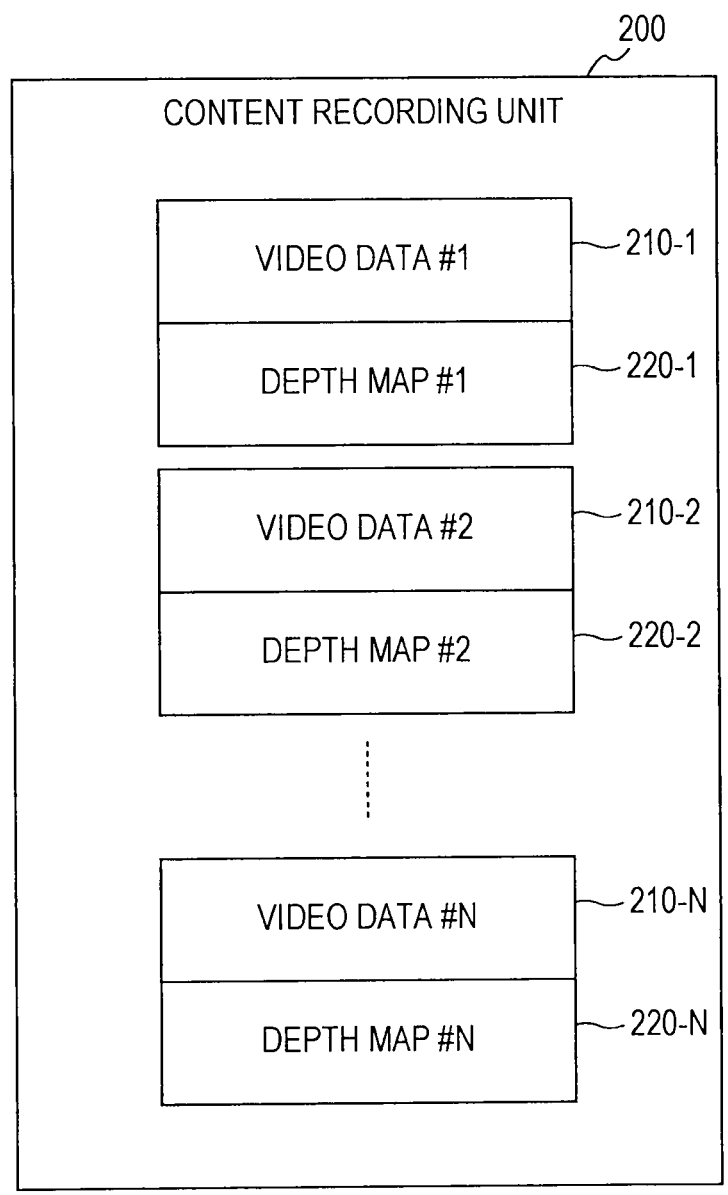
FIG. 2 is a diagram illustrating an example configuration of a content recording unit 200 in the embodiment of the present invention.

FIG. 2 is a diagram illustrating an example configuration of a content recording unit 200 in the embodiment of the present invention. The content recording unit 200 is the unit of recording the video file described above. The content recording unit 200 holds video data items #1 to #N (210-1 to 210-N) (hereinafter also referred to as "video data items 210") and depth maps #1 to #N (220-1 to 220-N) (hereinafter also referred to simply as "depth maps 220").

The video data items 210 and the depth maps 220 are associated with each other in units of, for example, GOPs (Groups Of Pictures). That is, the depth map 220-1 corresponds to the video data item 210-1 having the first GOP recorded therein, and the depth map 220-2 corresponds to the video data item 210-2 having the second GOP recorded therein. GOP is a group of frames of a moving image in MPEG (Moving Pictures Experts Group) standards. In many cases, one GOP includes 15 frames. If a frame rate of 29.97 frames/second is assumed, one GOP corresponds to approximately 0.5 seconds.

Figure 3:
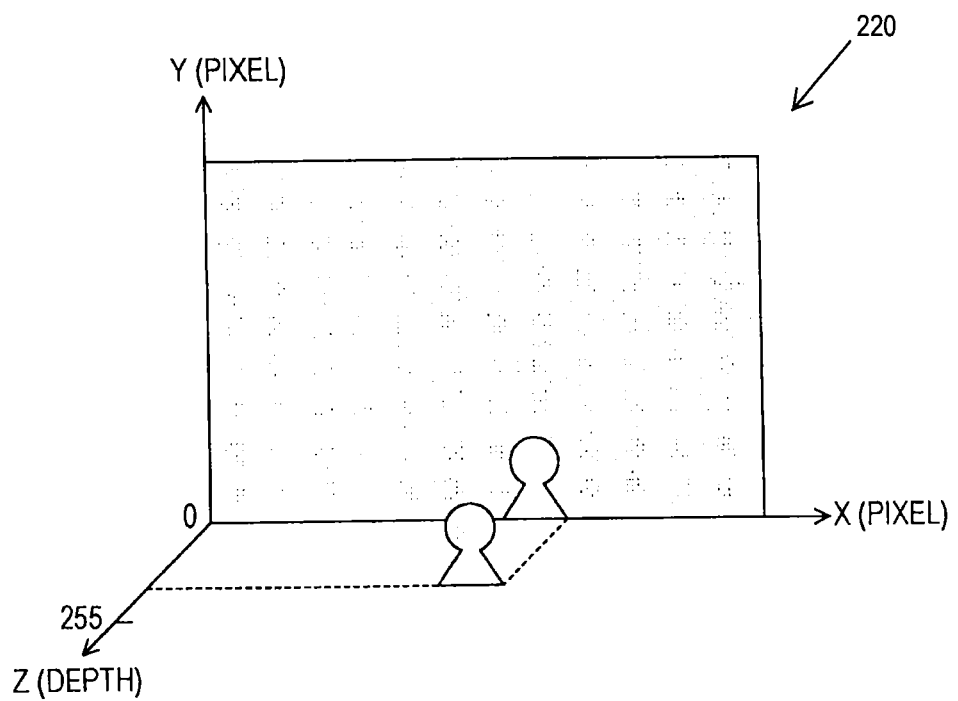
FIG. 3 is a diagram illustrating an example of a depth map 220 in the embodiment of the present invention.

FIG. 3 is a diagram illustrating an example of a depth map 220 in the embodiment of the present invention. The depth map 220 is configured to hold depth values in correspondence with individual pixels of a frame image. That is, the depth map 220 holds a depth value for each pixel on a two-dimensional XY plane. The depth values have values in the range of, for example, "0" to "255" using an 8-bit width, and it is assumed that the closer to the viewer a pixel is located, the larger value it has. In the example of this figure, depth values corresponding to a person area close to the viewer represent "255", depth values corresponding to a background area represent "0". It is to be noted that, in general, the depth map 220 is also referred to as a depth level map.

Figure 4:
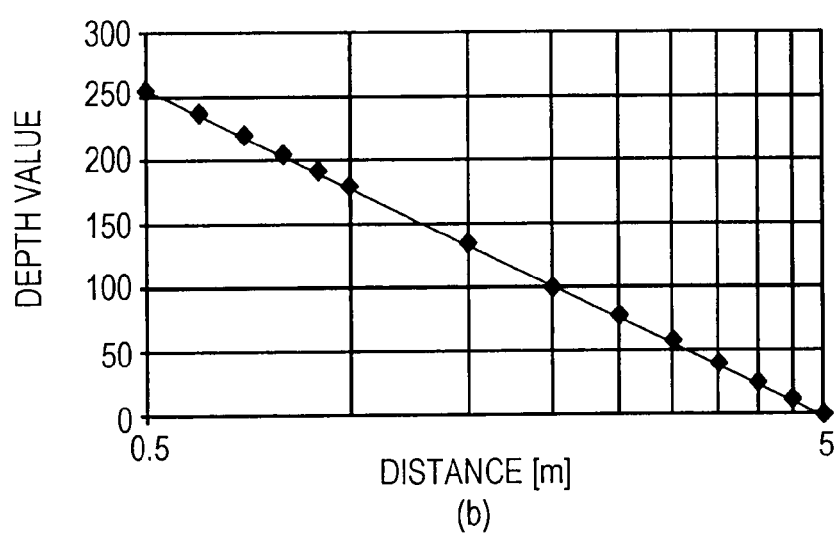
FIG. 4 includes diagrams illustrating an example of the relationship between depth values and distances in the embodiment of the present invention.

FIG. 4 includes diagrams illustrating an example of the relationship between depth values and distances in the embodiment of the present invention. As can be seen from part (a) of FIG. 4, if the distance from the lens to the object is less than or equal to 0.5 m, the depth value represents "255". If the distance exceeds 5.0 m, the depth value represents "0". In a case where the distance is greater than 0.5 m and less than or equal to 5.0 m, as in part (a) of FIG. 4, a value in the range of "0" to "255" is provided.

Furthermore, as can be seen from part (b) of FIG. 4, the depth values are set so as to have a linear relationship with the logarithmic values of the distances. This is to take the human sense that a nearby object is more sensitively perceivable than a distant object into account.

In a case where a depth value is set in the image capture apparatus 300, first, the depth of field of the lens is controlled to be the most shallow by setting an aperture opening state at the wide end, and the focal point of the lens is set to infinity (over 5.0 m). Thus, an in-focus video area of an in-screen area is recognized, and this area is set as a background area and is assigned a depth value of "0". Next, the focal point of the lens is set to a short distance (0.5 m) while the depth of field of the lens is controlled to be the most shallow by setting an aperture opening state at the wide end. Thus, an in-focus video area of an in-screen area is recognized, and this area is set as a shortest distance point and is assigned a depth value of "255". Then, the focal point of the lens is sequentially changed from the short distance (0.5 m) to infinity (over 5.0 m) while the depth of field of the lens is controlled to be the most shallow by setting an aperture opening state at the wide end, and the lens position is controlled to perform distance measurement. In synchronization with the measurement, in-focus video areas of in-screen areas are sequentially stored. In this way, a correspondence in part (a) of FIG. 4 is assigned.

After the above initial settings have been performed, it is possible to generate depth values corresponding to the individual pixels on the basis of object contour recognition or motion vector detection analysis. The depth values may be generated in real time during image capture, or may be generated afterwards from camera information. The camera information is obtained from inside the digital camera as information such as setting conditions at the time of photographing. For example, the camera information includes information such as an F-value, an exposure time, an exposure correction value, an AGC gain value, the presence/absence of flashlight, a lens focal distance, white balance, an object distance, camera shake correction, face meta-information, digital zoom magnification, effect photographing, and a vendor name. This camera information can be recorded onto a modified digital video pack (MDP) as a stream file when compliant with, for example, the AVCHD standard. In a case where the coordinates of a face that exists is known by using meta-information, the object distance in the camera information can be utilized as a distance at this coordinate position. The obtained distance can be converted into a depth value from the correspondence table in part (a) of FIG. 4.

Figure 5:
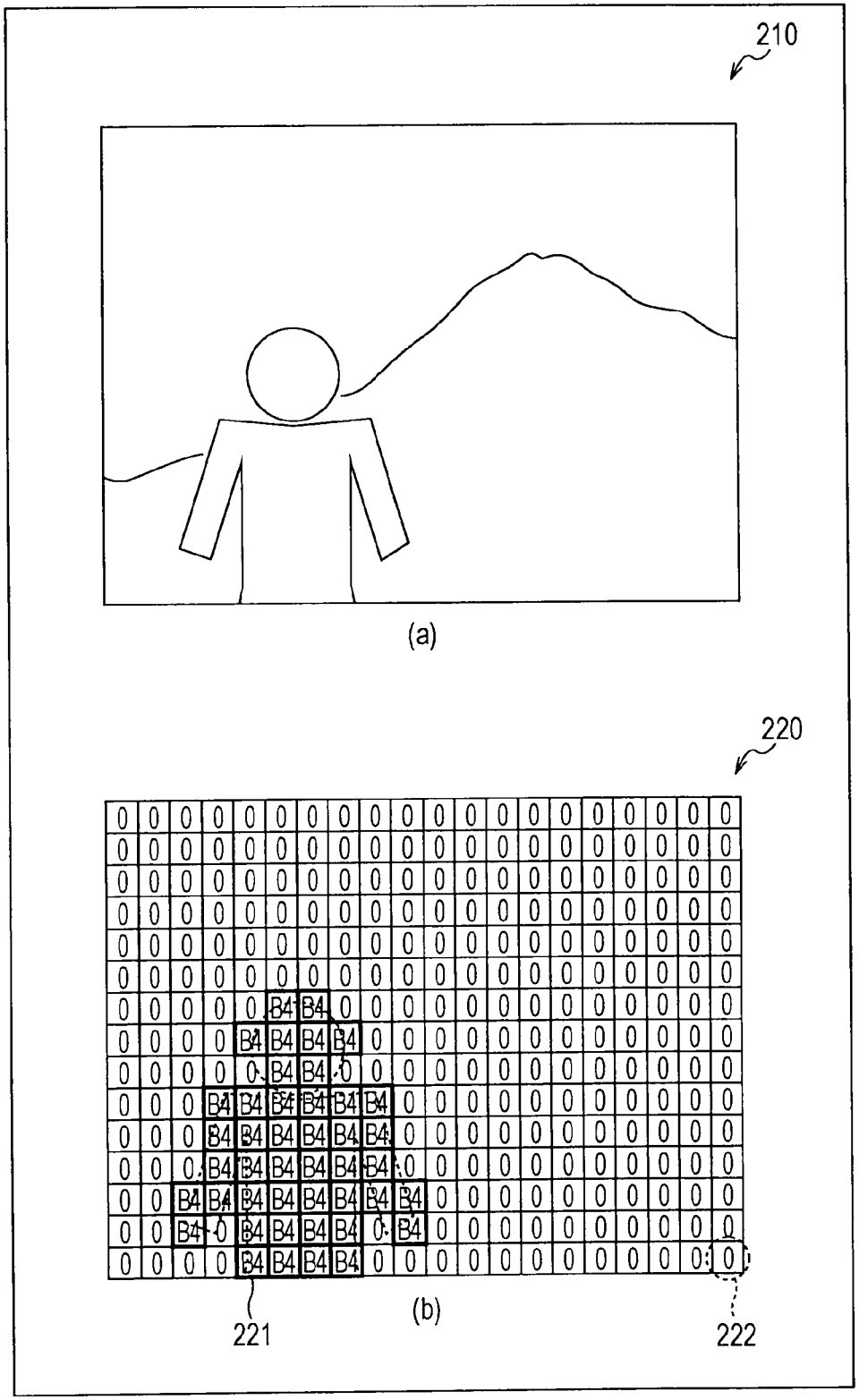
FIG. 5 includes diagrams illustrating the relationship between video data 210 and a depth map 220 according to the embodiment of the present invention.

FIG. 5 includes diagrams illustrating the relationship between video data 210 and a depth map 220 according to an embodiment of the present invention. Part (a) of FIG. 5 illustrates an example of the video data 210. In this example, a person appears in the vicinity of the image capture apparatus, and a background appears behind the person.

Part (b) of FIG. 5 illustrates an example of the depth map 220 corresponding to the video data 210 in part (a) of FIG. 5. A depth value 221 of the area of the person represents "B4" in hexadecimal notation, that is, "180" in decimal notation. This means that the person is positioned at a distance of 1.0 m from the image capture apparatus. A depth value 222 of the background area represents "0". This means that the background is positioned at infinity (over 5.0 m) from the image capture apparatus. The depth values included in the depth map 220 correspond to the individual pixels of the video data 210.

[First Mode of Depth Value Correction]

Figure 6:
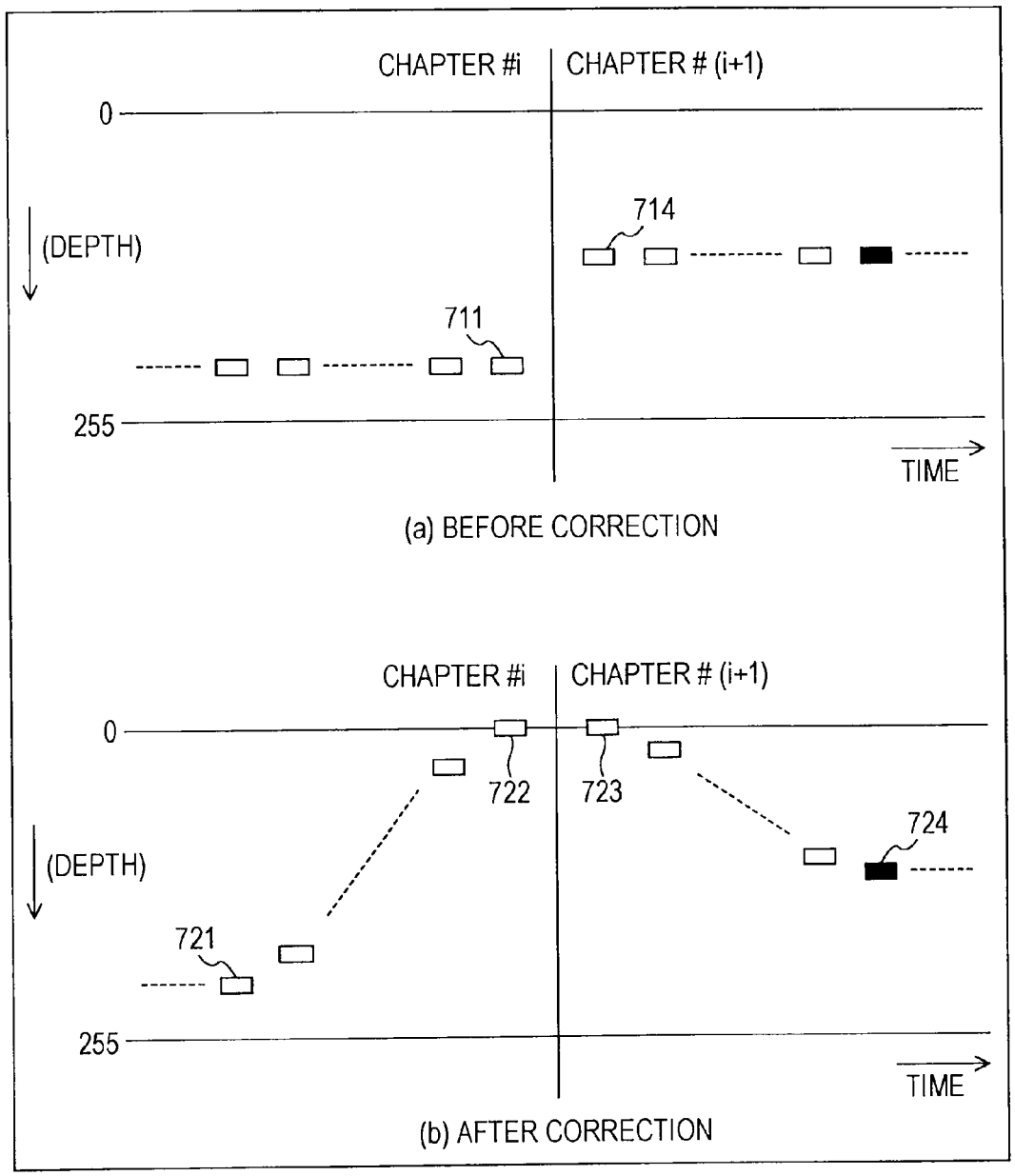
FIG. 6 includes diagrams illustrating a first mode of depth value correction according to the embodiment of the present invention.

FIG. 6 includes diagrams illustrating a first mode of depth value correction according to the embodiment of the present invention. As in part (a) of FIG. 6, a case where a depth value of an area within a frame rapidly changes on the occasion of a chapter change is assumed. Here, a depth value 711 of a specific area in an end portion of a chapter #i changes to a depth value 714 in a start portion of a chapter #(i+1). In this case, a depth value of a specific area rapidly changes, which may give an unnatural feeling to the viewer. It is to be noted that the specific area in this case is assumed to be an area that is a part of a frame corresponding to a person or the like, but may be the entire frame.

In the embodiment of the present invention, as the first mode of depth value correction, as in part (b) of FIG. 6, the entire depth values are temporarily corrected to zero (infinity) on the occasion of a chapter change. Thus, a rapid change of the depth values on the occasion of a chapter change can be suppressed. However, if the correction operation itself, for setting a depth value to zero, is performed rapidly, the correction may bring a new unnatural feeling. Therefore, it is desirable that on the occasion of correcting a depth value, the depth value be allowed to transition at a predetermined display speed for a period of time of, for example, 0.5 seconds or more. In the example of part (b) of FIG. 6, an original depth value 721 in the end portion of the chapter #i is allowed to sequentially transition at a predetermined display speed so that a depth value 722 of the end frame becomes zero. Similarly, a depth value 723 of the start frame in a chapter #(i+1) is set to zero, and is allowed to sequentially transition to an original depth value 724 in the start portion.

Figure 7:
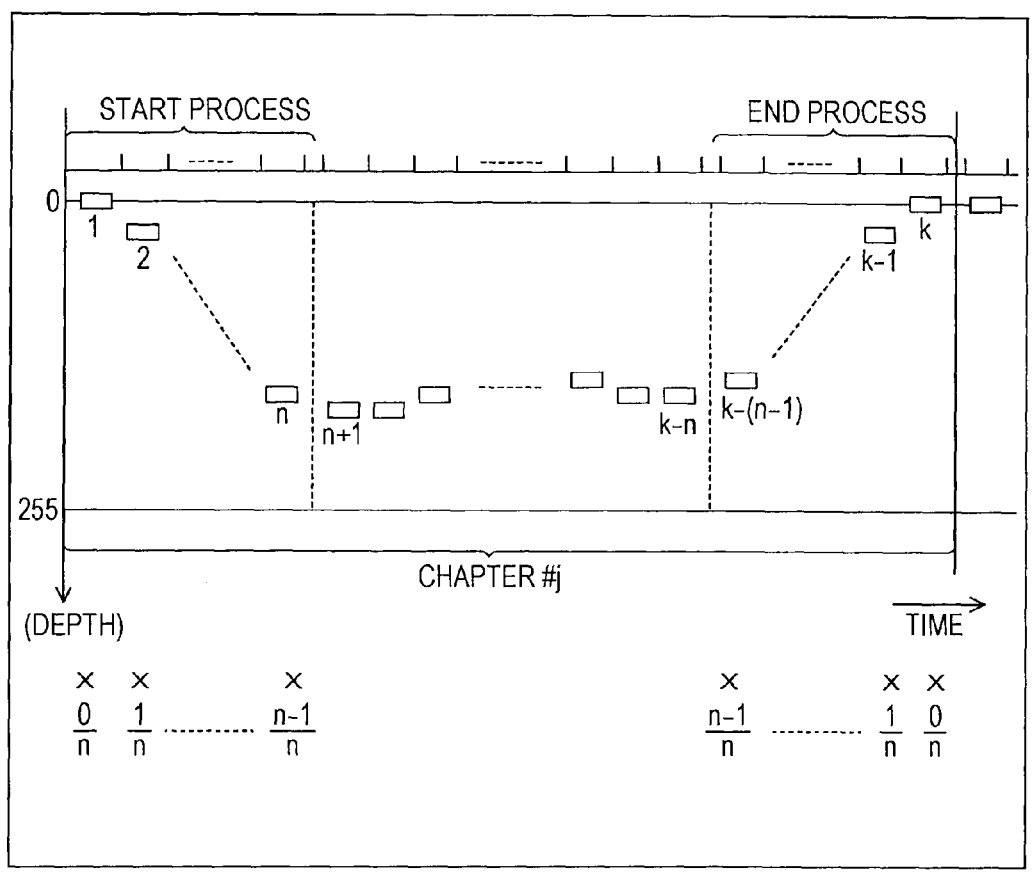
FIG. 7 is a diagram illustrating an entire chapter in the first mode of depth value correction according to the embodiment of the present invention.

FIG. 7 is a diagram illustrating an entire chapter in the first mode of depth value correction according to the embodiment of the present invention. Here, a chapter #j composed of k frames is assumed. In the chapter #j, depth values in n frames of the start portion and in n frames of the end portion are corrected individually.

In the n frames of the start portion of the chapter #j, a depth value sequentially increases from zero. In this example, it is assumed that the depth value increases from zero in steps of $(1/n)$ and converges to a value that is not subjected to correction in the $(n+1)$-th frame. That is, if it is assumed that the depth value of the $(n+1)$-th frame is represented by A, then, the depth value of the i-th frame (i is an integer in the range of 1 to n) is given by $A \times ((i-1)/n)$.

Furthermore, in the n frames of the end portion of the chapter #j, a depth value sequentially decreases toward zero. In this example, it is assumed that the depth value decreases in steps of $(1/n)$ and converges to zero in the k-th frame. That is, if it is assumed that the depth value of the $(k-n)$-th frame is represented by B, then, the depth value of the i-th frame (i is an integer in the range of $(k-(n-1))$ to k) is given by $B \times ((k-i)/n)$.

[Functional Configuration of First Mode of Depth Value Correction]

Figure 8:
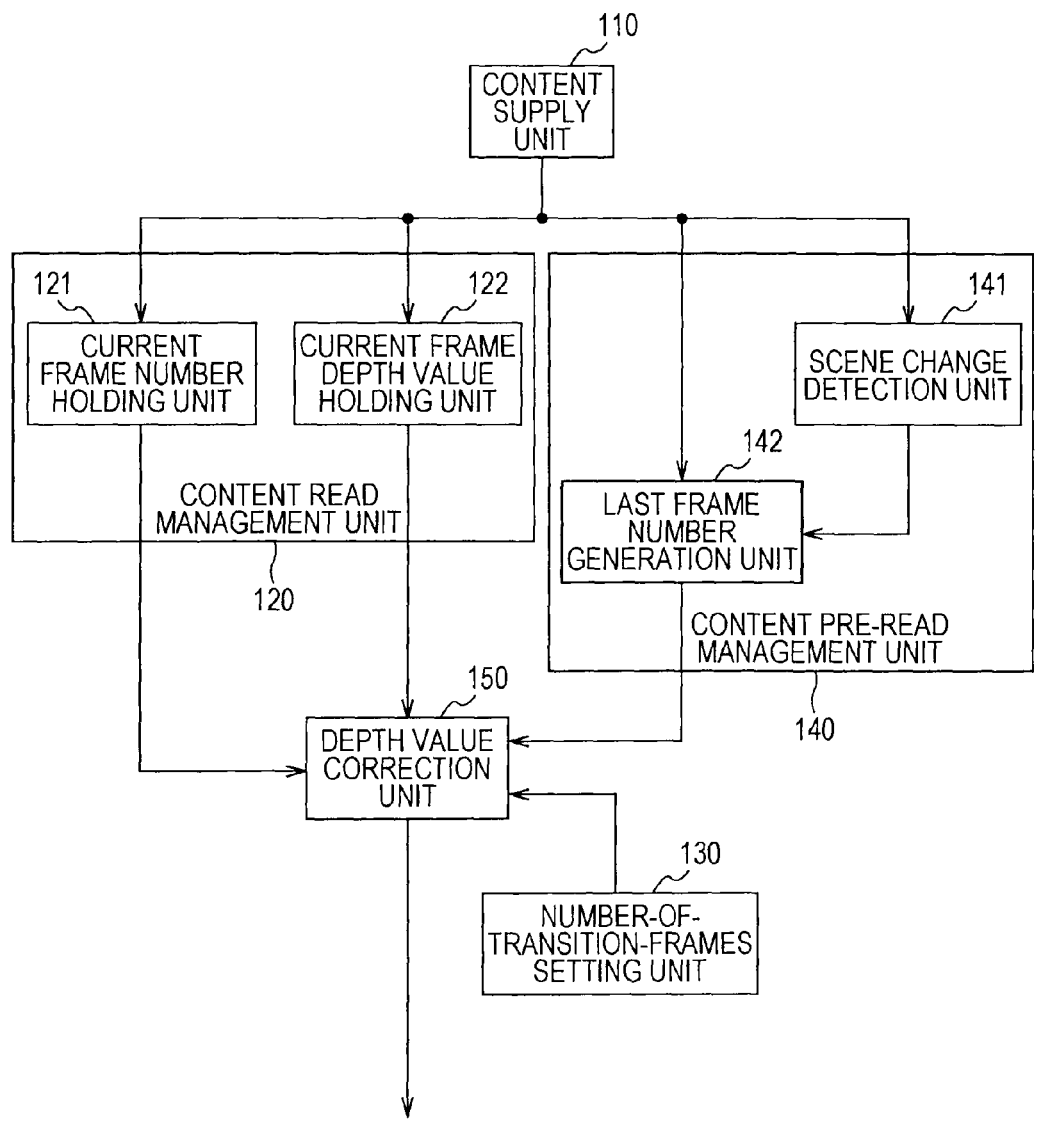
FIG. 8 is a diagram illustrating a first example functional configuration of a depth value correction mechanism in the embodiment of the present invention.

FIG. 8 is a diagram illustrating a first example functional configuration of a depth value correction mechanism in the embodiment of the present invention. This depth value correction mechanism is configured to allow a depth value to smoothly transition to zero (telephoto side) before and after a scene change. In the image capture apparatus 300, a depth map 220 may be set after a depth value obtained on the occasion of image capture is corrected by the depth information setting unit 332, or a depth value of a depth map 220 that is not corrected may be corrected by the depth information output unit 336 and output to the display unit 350. In the image capture apparatus 300, therefore, the depth information setting unit 332 or the depth information output unit 336 may be provided with the depth value correction mechanism. Furthermore, this depth value correction mechanism may be implemented not only in an image capture apparatus but also in an image information processing apparatus that handles video files.

This depth value correction mechanism includes a content supply unit 110, a content read management unit 120, a number-of-transition-frames setting unit 130, a content pre-read management unit 140, and a depth value correction unit 150.

The content supply unit 110 is configured to supply captured content. In the image capture apparatus 300, content is supplied by the image pickup element 321, the camera control unit 329, or the like. In the case of an image information processing apparatus, content is supplied by a read unit (not illustrated) from a storage unit that stores the content.

The content read management unit 120 is configured to perform management to read the content supplied from the content supply unit 110 frame-by-frame. The content read management unit 120 includes a current frame number holding unit 121 and a current frame depth value holding unit 122. The current frame number holding unit 121 is configured to hold the frame number of the current frame read from the content supply unit 110. The current frame depth value holding unit 122 is configured to hold the depth value corresponding to the current frame read from the content supply unit 110.

The number-of-transition-frames setting unit 130 is configured to set in advance the number of frames to be corrected before and after a scene change. In the example of FIG. 7, each group of n frames is set as the number of transition frames before and after a scene change.

The content pre-read management unit 140 is configured to perform management to pre-read a (future) frame ahead of the current frame in the content prior to the read by the content read management unit 120. The content pre-read management unit 140 includes a scene change detection unit 141 and a last frame number generation unit 142. The scene change detection unit 141 is configured to detect the position of a scene change in the pre-read content. As the scene change, for example, a chapter change is assumed. The last frame number generation unit 142 is configured to generate the last frame number of the current scene on the basis of the scene change position detected by the scene change detection unit 141. In the example of FIG. 7, the k-th frame is the last frame.

The depth value correction unit 150 is configured to correct the depth value held in the current frame depth value holding unit 122. In the example of FIG. 7, the depth value is corrected according to the following equation:

depth value after correction=depth value before correction×$m/n$ where n is the number of transition frames held in the number-of-transition-frames setting unit 130, and m is set as below in accordance with the start portion or end portion of a scene change:

In the case of the scene start n frames; m=current frame number−1

In the case of the scene end n frames; m=last frame number−current frame number

It is to be noted that the current frame number is supplied from the current frame number holding unit 121 and that the last frame number is supplied from the last frame number generation unit 142.

[Example Operation of First Mode of Depth Value Correction]

Figure 9:
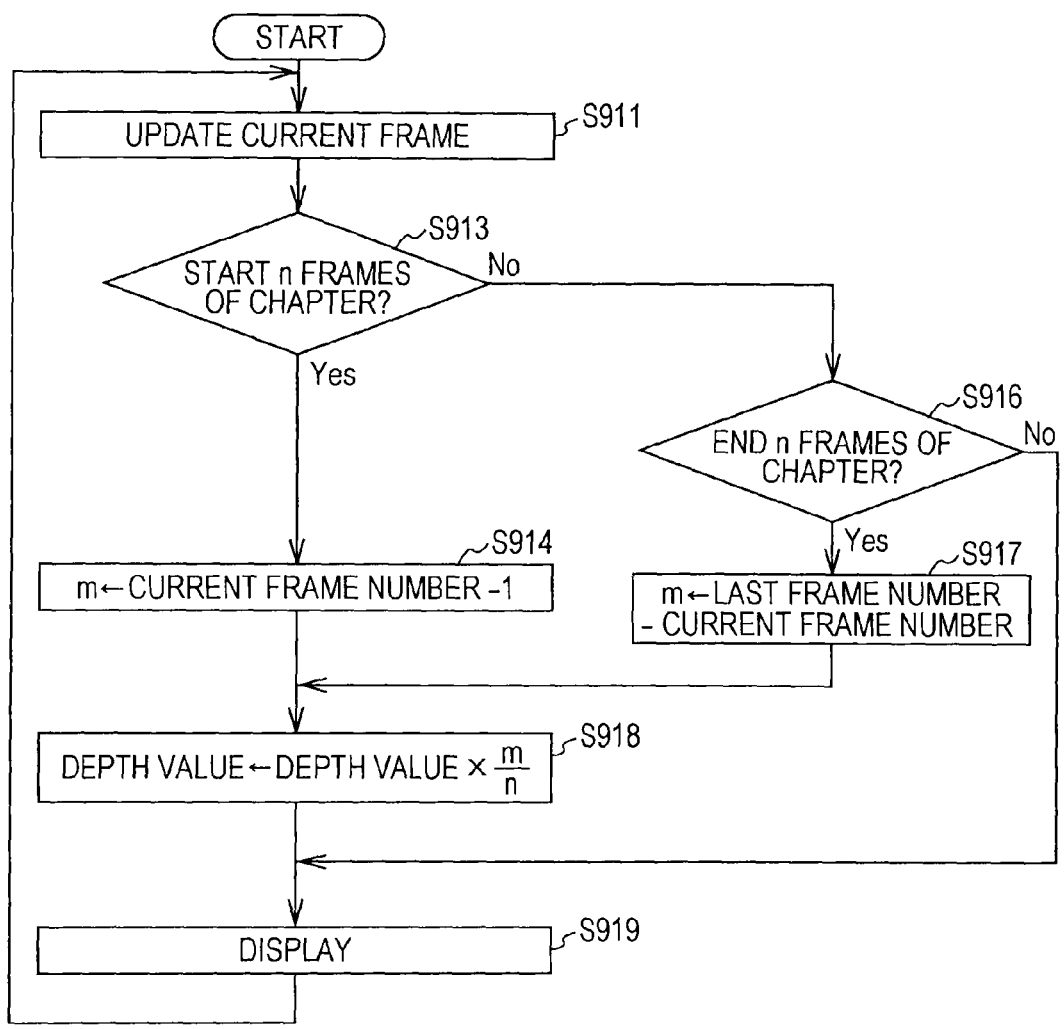
FIG. 9 is a diagram illustrating a processing flow according to the first mode of depth value correction in the embodiment of the present invention.

FIG. 9 is a diagram illustrating a processing flow according to the first mode of depth value correction in the embodiment of the present invention. Here, as an example of the scene change, an example in which a chapter change is detected will be described.

First, in the content read management unit 120, an update of the current frame is performed (step S911). That is, the current frame number held in the current frame number holding unit 121 is updated, and, in addition, the depth value held in the current frame depth value holding unit 122 is updated.

If the current frame is in the start n frames of the chapter (Yes at step S913), the variable m is set to "current frame number−1" (step S914). On the other hand (No at step S913), if the current frame is in the end n frames of the chapter (Yes at step S916), the variable m is set to "last frame number−current frame number" (step S917).

Then, if the current frame is in the start n frames or end n frames of the chapter, the depth value held in the current frame depth value holding unit 122 is corrected to be multiplied by "m/n" by the depth value correction unit 150 (step S918).

Thereafter, a stereoscopic image is displayed on the display unit 350 on the basis of the video data and depth value of the current frame (step S919). If the current frame is in the start n frames or end n frames of the chapter, a depth value corrected in the manner described above is used, and a depth value that is not corrected is used for the other frames (No at step S916). It is to be noted that while, here, the operation has been described in the context of the image capture apparatus 300 including the display unit 350, a depth value may be corrected and stored on the premise of later display.

In this manner, according to the first mode of the embodiment of the present invention, a depth value can be allowed to smoothly transition to zero (telephoto side) before and after a scene change, and an unnatural feeling caused by a rapid change of the depth value can be overcome.

2. Second Embodiment

Second Mode of Depth Value Correction

Figure 10:
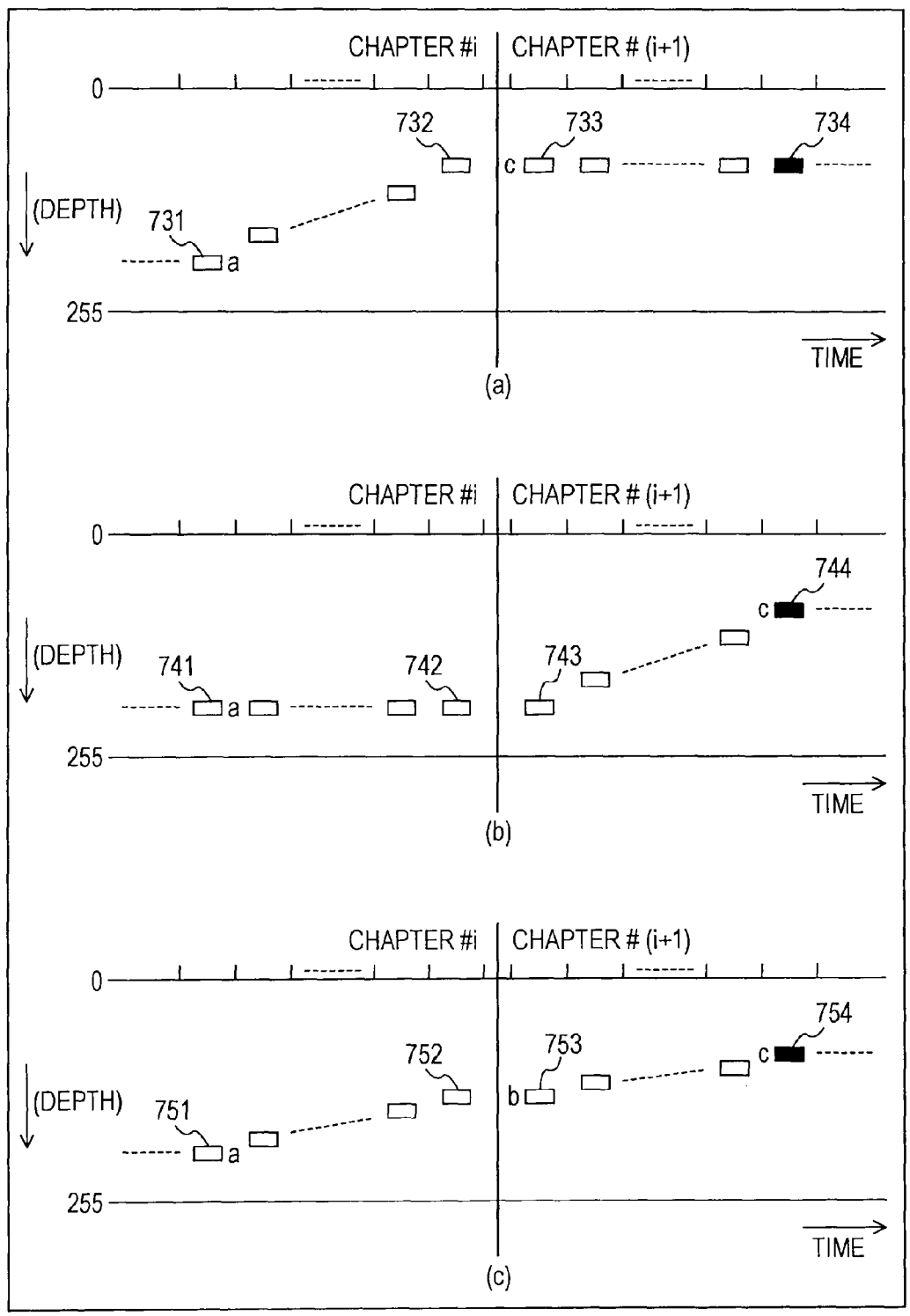
FIG. 10 includes diagrams illustrating a second mode of depth value correction according to the embodiment of the present invention.

FIG. 10 includes diagrams illustrating a second mode of depth value correction according to the embodiment of the present invention. In the first mode described above, a depth value is allowed to temporarily transition to zero. In this second mode, in contrast, it is assumed that a depth value is allowed to directly transition at a predetermined display speed before and after a scene change.

Part (a) of FIG. 10 illustrates an example in which a depth value is allowed to transition only in the end portion of a chapter. That is, in this example, a depth value 731(a) is allowed to transition to a depth value 732 in the end portion of a chapter, and, in the start portion of a chapter, a constant value is maintained from a depth value 733(c) to a depth value 734.

Part (b) of FIG. 10 illustrates an example in which a depth value is allowed to transition only in the start portion of a chapter. That is, in this example, a constant value (a) is maintained from a depth value 741 to a depth value 742 in the end portion of a chapter, and a depth value 743 is allowed to transition to a depth value 744(c) in the start portion of a chapter.

Part (c) of FIG. 10 illustrates an example in which a depth value is allowed to transition both in the start portion and end portion of a chapter. That is, in this example, a depth value 751(a) is allowed to transition to a depth value 752 in the end portion of a chapter, and a depth value 753(b) is also allowed to transition to a depth value 754 in the start portion of a chapter.

In this manner, in a case where a depth value is allowed to directly transition, the transition may be performed in any period before and after a chapter change.

[Functional Configuration of Second Mode of Depth Value Correction]

Figure 11:
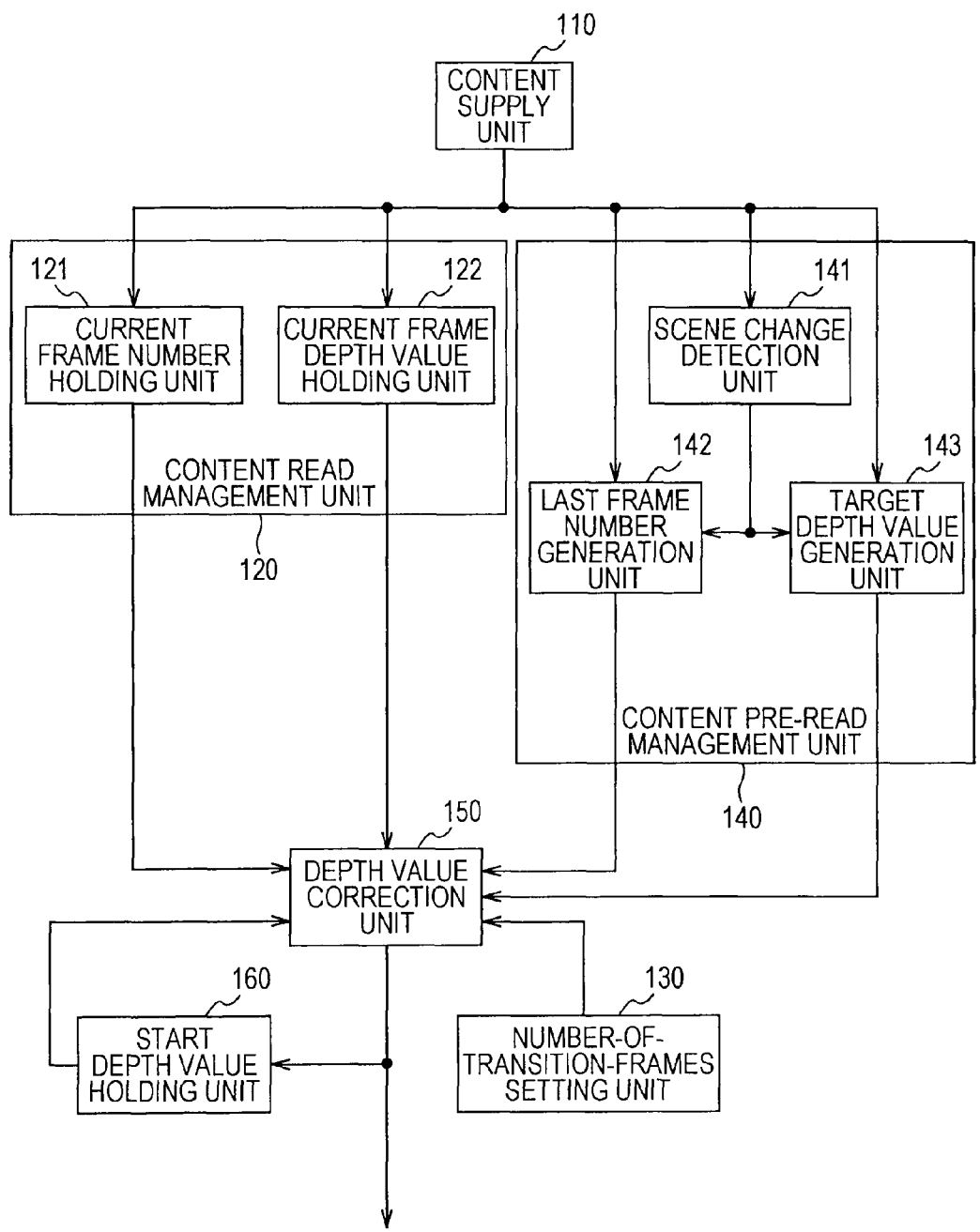
FIG. 11 is a diagram illustrating a second example functional configuration of the depth value correction mechanism in the embodiment of the present invention.

FIG. 11 is a diagram illustrating a second example functional configuration of the depth value correction mechanism in the embodiment of the present invention. This depth value correction mechanism is configured to allow, in a case where a depth value rapidly changes, the change to smoothly transition. In the following, as an example of the scene change, an example in which a chapter change is detected will be described.

The second functional configuration of this depth value correction mechanism is similar to the first functional configuration described with reference to FIG. 8 in that a content supply unit 110, a content read management unit 120, a number-of-transition-frames setting unit 130, a content pre-read management unit 140, and a depth value correction unit 150 are provided. The second functional configuration of this depth value correction mechanism includes a start depth value holding unit 160 in addition to the first functional configuration. Furthermore, the content pre-read management unit 140 further includes a target depth value generation unit 143.

The start depth value holding unit 160 is configured to hold a depth value of a start frame on the occasion of the transition of the depth value. In the example of part (a) of FIG. 10, the depth value 731 of the chapter #i serves as the depth value of a start frame. In the example of part (b) of FIG. 10, the depth value 743 of the chapter #(i+1) serves as the depth value of a start frame. Furthermore, in the example of part (c) of FIG. 10, the depth value 751 of the chapter #i and the depth value 753 of the chapter #(i+1) serve as the depth values of start frames. A start frame is determined based on the scene change position detected by the scene change detection unit 141 and the number of transition frames set by the number-of-transition-frames setting unit 130.

The target depth value generation unit 143 is configured to generate a target depth value on the occasion of correcting a depth value. In the example of part (a) of FIG. 10, the depth value 732 of the chapter #i serves as a target depth value. In the example of part (b) of FIG. 10, the depth value 744 of the chapter #(i+1) serves as a target depth value. Furthermore, in the example of part (c) of FIG. 10, the depth value 752 of the chapter #i and the depth value 754 of the chapter #(i+1) serve as target depth values. A frame corresponding to a target depth value is determined based on the scene change position detected by the scene change detection unit 141 and the number of transition frames set by the number-of-transition-frames setting unit 130. It is to be noted that since the depth value 744 in the example of part (b) of FIG. 10 and the depth value 754 in the example of part (c) of FIG. 10 can be regarded as being substantially equivalent to the depth value of the current frame, the depth value of the current frame may be used instead. Furthermore, a target depth value can be arbitrarily determined. For example, a target depth value may be set in accordance with the dynamic range of the entirety of the next chapter.

In the second functional configuration of this depth value correction mechanism, the depth value correction unit 150 corrects a depth value as follows. As in part (a) of FIG. 10, in a case where the transition is performed in a chapter before a change, a depth value in the end n frames of the chapter is corrected using Equation 1 as follows:

$$\text{depth value after correction} = \text{target depth value} + (\text{target depth value} - \text{depth value before correction}) \times m/n \quad \text{(Equation 1)}$$

where
m = last frame number − current frame number.

As in part (b) of FIG. 10, in a case where the transition is performed in a chapter after a change, a depth value in the start n frames of the chapter is corrected using Equation 2 as follows:

$$\text{depth value after correction} = \text{start depth value} + (\text{depth value before correction} - \text{start depth value}) \times m/n \quad \text{(Equation 2)}$$

where
m = current frame number − 1.

As in part (c) of FIG. 10, in a case where the transition is performed over chapters before and after a change, a depth value in the start n frames of the chapter is corrected using Equation 2 given above. Furthermore, a depth value in the end n frames of the chapter is corrected using Equation 1 given above.

[Example Operation of Second Mode of Depth Value Correction]

Figure 12:
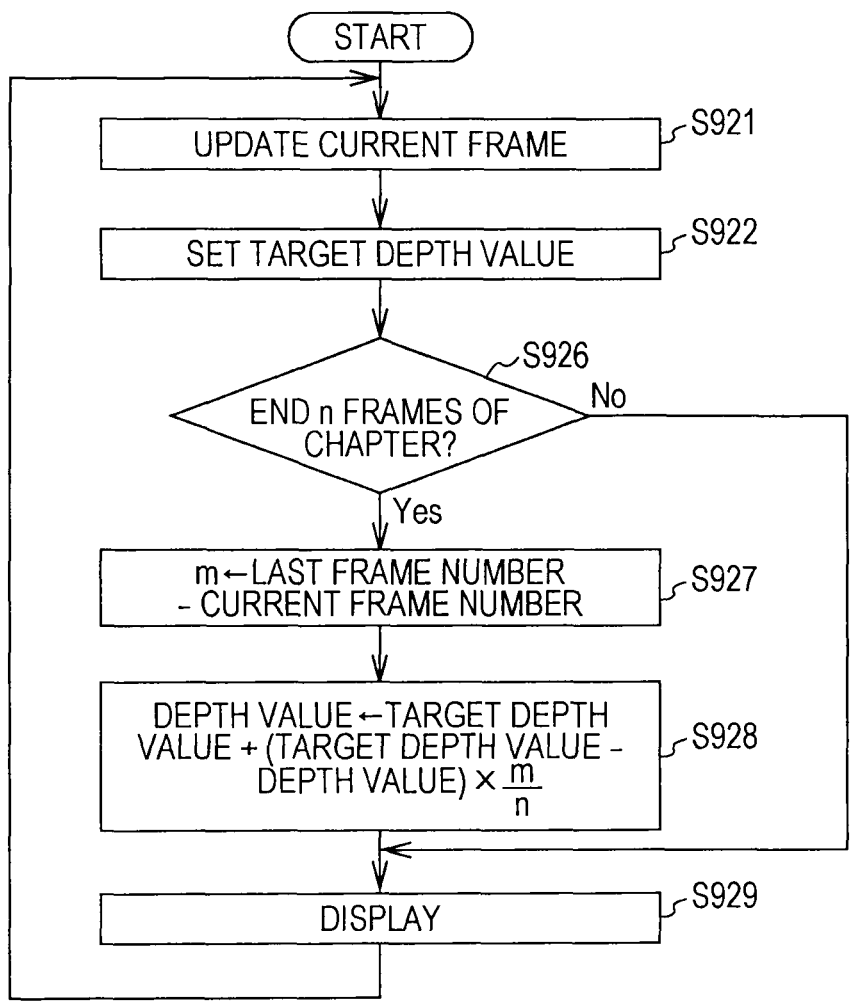
FIG. 12 is a diagram illustrating a first processing flow according to the second mode of depth value correction in the embodiment of the present invention.

FIG. 12 is a diagram illustrating a first processing flow according to the second mode of depth value correction in the embodiment of the present invention. This first process represents an example in a case where the transition is performed in a chapter before a change as in part (a) of FIG. 10.

First, in the content read management unit 120, an update of the current frame is performed (step S921). That is, the current frame number held in the current frame number holding unit 121 is updated, and, in addition, the depth value held in the current frame depth value holding unit 122 is updated. Furthermore, in the target depth value generation unit 143, a target depth value on the occasion of the transition is generated and is set (step S922). The target depth value in this case is the depth value 732 in part (a) of FIG. 10.

If the current frame is in the end n frames of the chapter (Yes at step S926), the variable m is set to "last frame number − current frame number" (step S927). Then, the depth value held in the current frame depth value holding unit 122 is corrected by the depth value correction unit 150 using Equation 1 given above (step S928).

Thereafter, a stereoscopic image is displayed on the display unit 350 on the basis of the video data and depth value of the current frame (step S929). If the current frame is in the end n frames of the chapter, a depth value corrected in the manner described above is used, and a depth value that is not corrected is used for the other frames (No at step S926). It is to be noted that while, here, the operation has been described in the context of the image capture apparatus 300 including the display unit 350, a depth value may be corrected and stored on the premise of later display.

Figure 13:
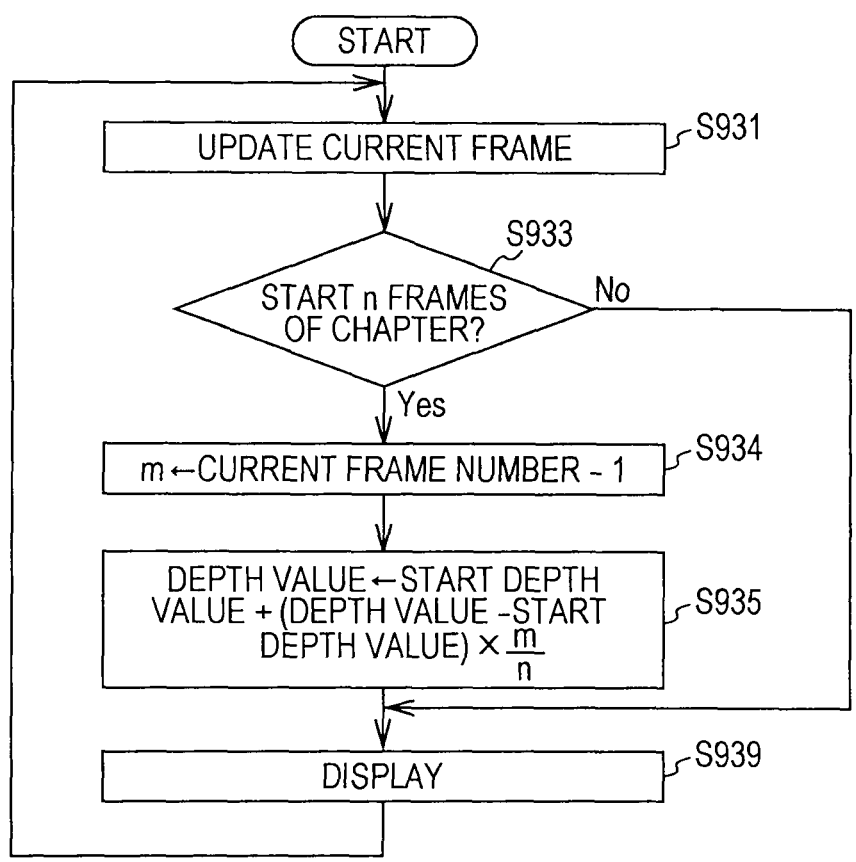
FIG. 13 is a diagram illustrating a second processing flow according to the second mode of depth value correction in the embodiment of the present invention.

FIG. 13 is a diagram illustrating a second processing flow according to the second mode of depth value correction in the embodiment of the present invention. This second process represents an example in a case where the transition is performed in a chapter after a change as in part (b) of FIG. 10.

First, in the content read management unit 120, an update of the current frame is performed (step S931). That is, the current frame number held in the current frame number holding unit 121 is updated, and, in addition, the depth value held in the current frame depth value holding unit 122 is updated.

If the current frame is in the start n frames of the chapter (Yes at step S933), the variable m is set to "current frame number−1" (step S934). Then, the depth value held in the current frame depth value holding unit 122 is corrected by the depth value correction unit 150 using Equation 2 given above (step S935).

Thereafter, a stereoscopic image is displayed on the display unit 350 on the basis of the video data and depth value of the current frame (step S939). If the current frame is in the start n frames of the chapter, a depth value corrected in the manner described above is used, and a depth value that is not corrected is used for the other frames (No at step S933). It is to be noted that while, here, the operation has been described in the context of the image capture apparatus 300 including the display unit 350, a depth value may be corrected and stored on the premise of later display.

Figure 14:
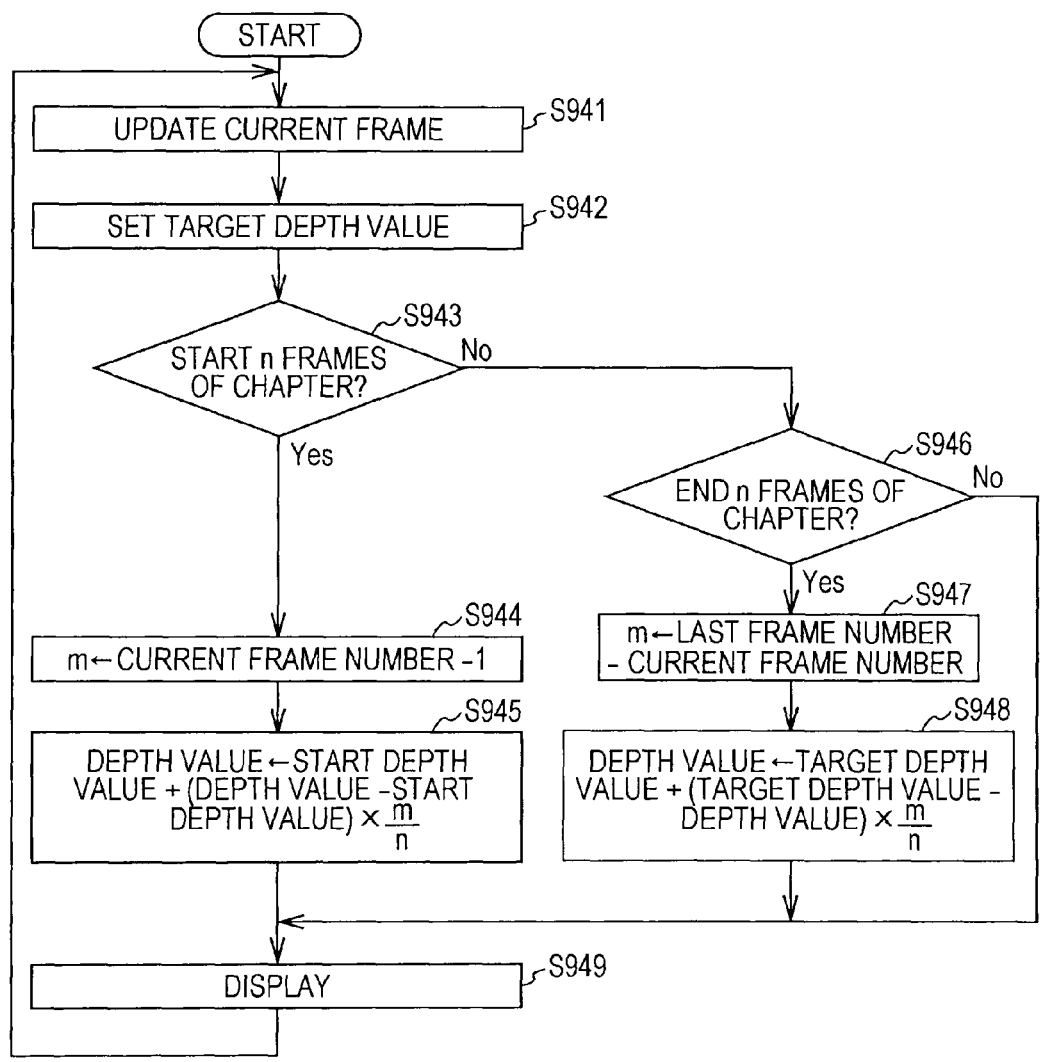
FIG. 14 is a diagram illustrating a third processing flow according to the second mode of depth value correction in the embodiment of the present invention.

FIG. 14 is a diagram illustrating a third processing flow according to the second mode of depth value correction in the embodiment of the present invention. This third process represents an example in a case where the transition is performed over chapters before and after a change as in part (c) of FIG. 10.

First, in the content read management unit 120, an update of the current frame is performed (step S941). That is, the current frame number held in the current frame number holding unit 121 is updated, and, in addition, the depth value held in the current frame depth value holding unit 122 is updated. Furthermore, in the target depth value generation unit 143, a target depth value on the occasion of the transition is generated and is set (step S942). The target depth value in this case is the depth value 752 in part (c) of FIG. 10. The depth value 752 may be implemented using, for example, an average value (b) between the depth value of the end portion of the chapter #i and the depth value of the start portion of the chapter #(i+1).

If the current frame is in the start n frames of the chapter (Yes at step S943), the variable m is set to "current frame number−1" (step S944). Then, the depth value held in the current frame depth value holding unit 122 is corrected by the depth value correction unit 150 using Equation 2 given above (step S945).

On the other hand (No at step S943), if the current frame is in the end n frames of the chapter (Yes at step S946), the variable m is set to "last frame number−current frame number" (step S947). Then, the depth value held in the current frame depth value holding unit 122 is corrected by the depth value correction unit 150 using Equation 1 given above (step S948).

Thereafter, a stereoscopic image is displayed on the display unit 350 on the basis of the video data and depth value of the current frame (step S949). If the current frame is the start n frames or end n frames of the chapter, a depth value corrected in the manner described above is used, and a depth value that is not corrected is used for the other frames (No at step S946). It is to be noted that while, here, the operation has been described in the context of the image capture apparatus 300 including the display unit 350, a depth value may be corrected and stored on the premise of later display.

In this manner, according to the second mode of the embodiment of the present invention, a depth value can be allowed to smoothly transition before and after a scene change, and an unnatural feeling caused by a rapid change of the depth value can be overcome.

3. Third Embodiment

Relationship Between Still Image Data and Moving Image Data

Figure 15:
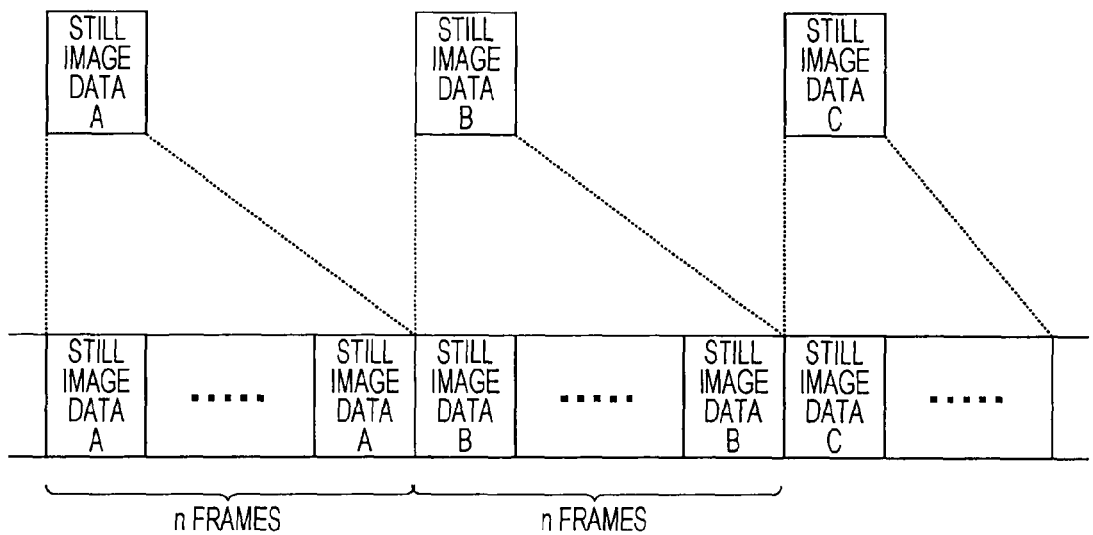
FIG. 15 is a diagram illustrating the relationship between still image data and moving image data in a third embodiment of the present invention.

FIG. 15 is a diagram illustrating the relationship between still image data and moving image data according to a third embodiment of the present invention. In the third embodiment, stereoscopic display of still image data in a slideshow format is assumed. Here, moving image data is generated by distributing still image data in units of n frames. That is, n frames of still image data A are arranged, thereafter, n frames of still image data B are arranged, and further n frames of still image data C are arranged. Each frame of moving image data is arranged in this manner. Similarly to frame images described with reference to FIG. 3, the still image data has image data and a depth value, and supports stereoscopic display.

Even such moving image data based on still image data may involve, similarly to the case of general moving images, an unnatural feeling caused by a rapid change of a depth value. In particular, in the case of a slideshow format, a depth value can possibly rapidly change on the occasion of changing of still image data.

[Third Mode of Depth Value Correction]

Figure 16:
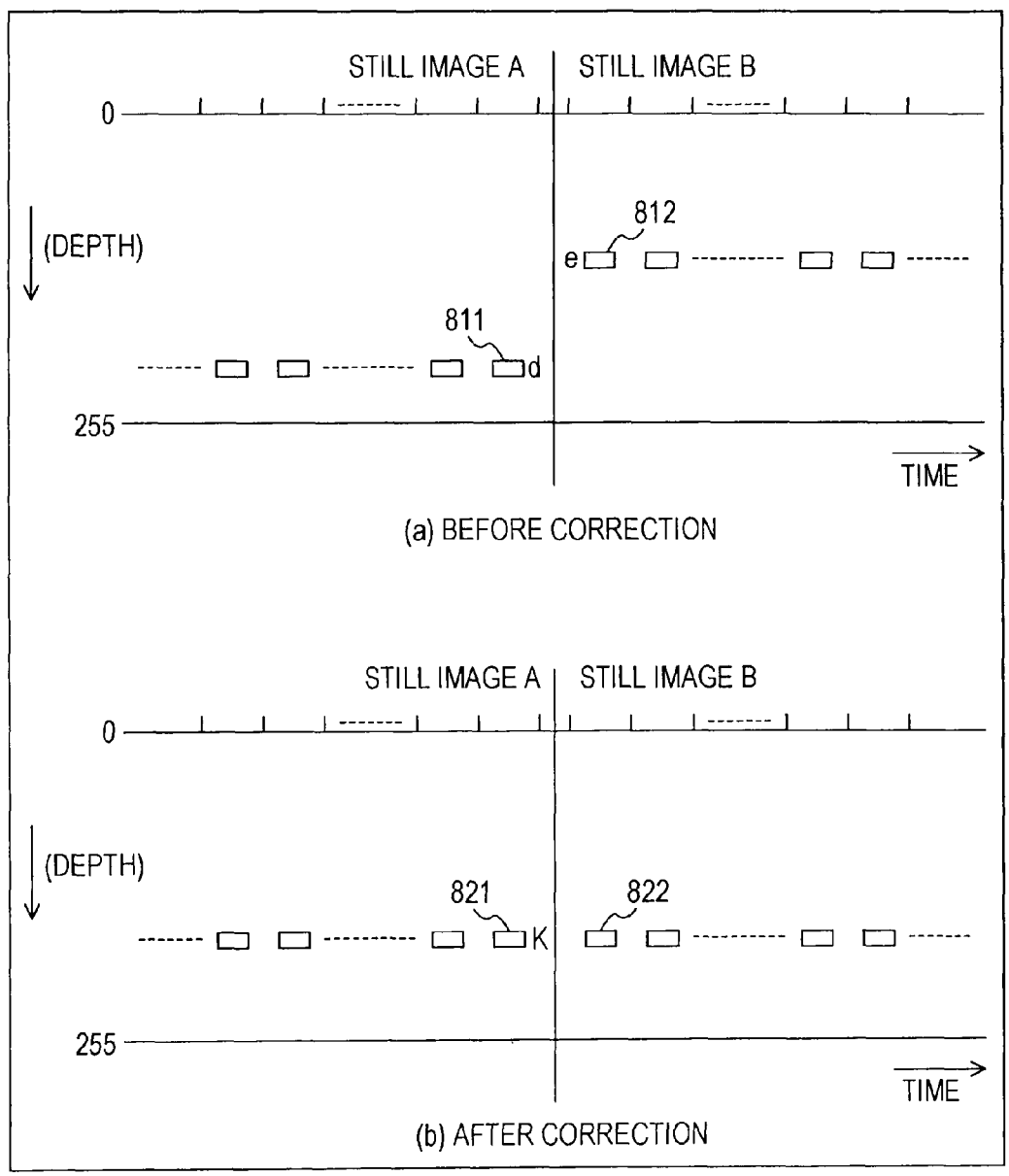
FIG. 16 includes diagrams illustrating a third mode of depth value correction according to the embodiment of the present invention.

FIG. 16 includes diagrams illustrating a third mode of depth value correction according to the embodiment of the present invention. As in part (a) of FIG. 16, a case where a depth value of an area within a still image rapidly changes on the occasion of the change between still images is assumed. Here, a depth value 811 (d) of a specific area in an end portion of a still image A changes to a depth value 812 (e) in a start portion of a still image B. In this case, a depth value of a specific area rapidly changes, which may give an unnatural feeling to the viewer. It is to be noted that the specific area in this case is assumed to be an area that is a part of a frame corresponding to a person or the like, but may be the entire frame.

In the embodiment of the present invention, as the third mode of depth value correction, as in part (b) of FIG. 16, a depth value of a specific area of a still image is corrected so as to become a constant value (K). Thus, a rapid change of the depth value on the occasion of a chapter change can be suppressed.

[Functional Configuration of Third Mode of Depth Value Correction]

Figure 17:
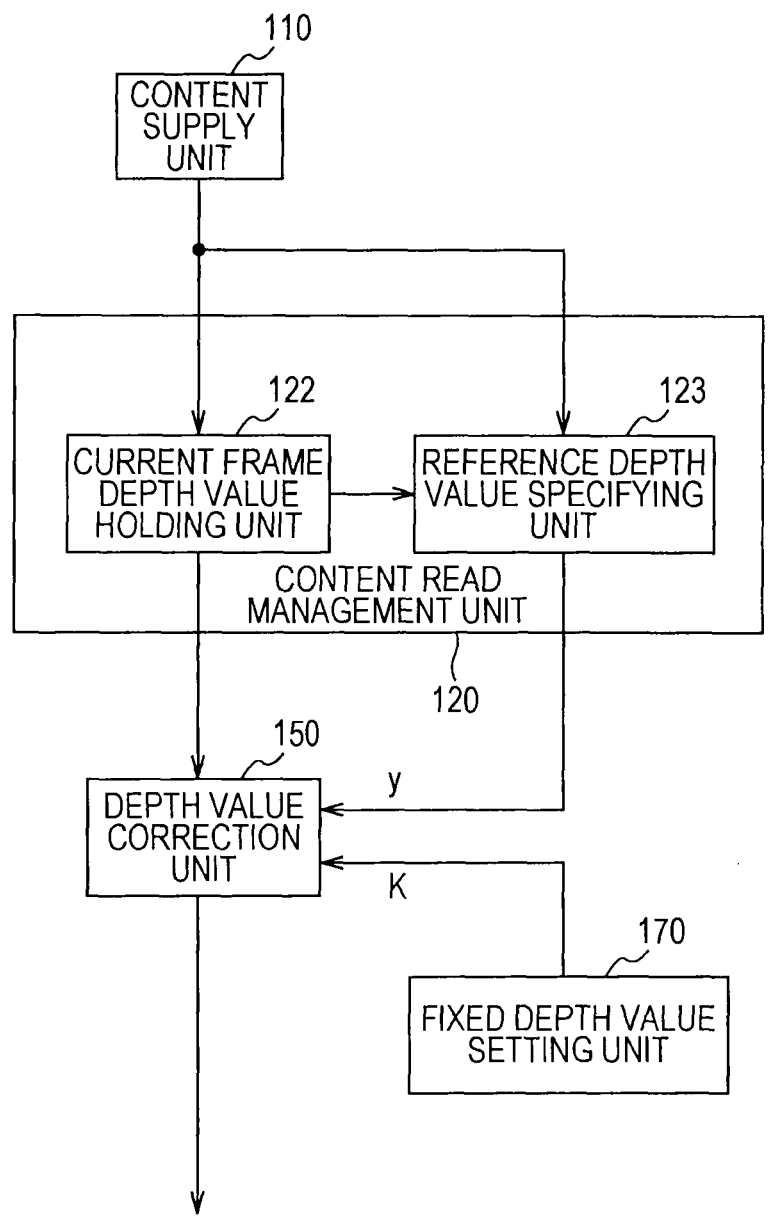
FIG. 17 is a diagram illustrating a third example functional configuration of the depth value correction mechanism in the embodiment of the present invention.

FIG. 17 is a diagram illustrating a third example functional configuration of the depth value correction mechanism according to the embodiment of the present invention. This depth value correction mechanism is configured to maintain a depth value of a specific area at a constant value in moving image data including still image data in a slideshow format. In the following, as an example of the scene change, an example in which a chapter change is detected will be described.

The third functional configuration of this depth value correction mechanism is similar to the first functional configuration described with reference to FIG. 8 in that a content supply unit 110, a content read management unit 120, and a depth value correction unit 150 are provided. In the third functional configuration of this depth value correction mechanism, the number-of-transition-frames setting unit 130 and the content pre-read management unit 140 are removed from the first functional configuration, and a fixed depth value setting unit 170 is further provided. Furthermore, the content read management unit 120 further includes a reference depth value specifying unit 123.

The reference depth value specifying unit 123 is configured to specify a depth value (reference depth value) serving as a reference for a still image supplied from the content supply unit 110. In order to specify this reference depth value, it is conceivable to extract some feature value in a still image and specify a reference depth value on the basis of the feature value. For example, it is conceivable to extract faces in a still image, select a priority face to which attention is to be paid from among the faces, and specify the depth value of the priority face as a reference depth value. As a priority face, the face that is located closest to the center or the largest face can be selected. Furthermore, for example, the depth value positioned at the closest distance may be specified.

The fixed depth value setting unit 170 is configured to set a constant value to be fixed as a depth value of a specific area of a still image. This constant value set in the fixed depth value setting unit 170 is referred to as a fixed depth value. In the case of the example of part (b) of FIG. 16, the constant value K is set as a fixed depth value.

Therefore, the depth value correction unit 150 corrects the depth value held in the current frame depth value holding unit 122 according to the following equation:

depth value after correction=depth value before correction×$K/y$ where K denotes the fixed depth value set in the fixed depth value setting unit 170, and y denotes the reference depth value specified by the reference depth value specifying unit 123.

[Example Operation of Third Mode of Depth Value Correction]

Figure 18:
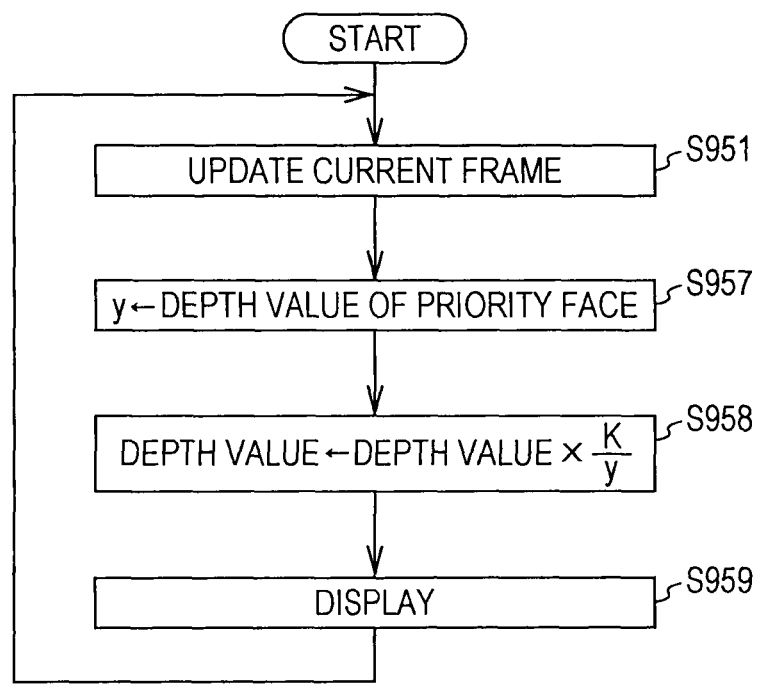
FIG. 18 is a diagram illustrating a processing flow according to the third mode of depth value correction in the embodiment of the present invention.

FIG. 18 is a diagram illustrating a processing flow according to the third mode of depth value correction in the embodiment of the present invention. Here, as an example of the scene change, an example in which a chapter change is detected will be described.

First, in the content read management unit 120, an update of the current frame is performed (step S951). That is, the depth value held in the current frame depth value holding unit 122 is updated. Furthermore, in the reference depth value specifying unit 123, a depth value is specified from the still image of the current frame (step S957). Here, it is assumed that, as an example, a priority face is detected and a reference depth value y of the priority face is specified.

Then, the depth value held in the current frame depth value holding unit 122 is corrected to be multiplied by "K/y" by the depth value correction unit 150 (step S958). Here, K denotes the fixed depth value set in the fixed depth value setting unit 170, and y denotes the reference depth value specified by the reference depth value specifying unit 123.

Thereafter, a stereoscopic image is displayed on the display unit 350 on the basis of the video data and depth value of the current frame (step S959). It is to be noted that while, here, the operation has been described in the context of the image capture apparatus 300 including the display unit 350, a depth value may be corrected and stored on the premise of later display.

In this manner, according to the third mode of the embodiment of the present invention, in moving image data including still image data in a slideshow format, a depth value of a specific area can be maintained at a constant value, and an unnatural feeling caused by a rapid change of the depth value can be overcome.

4. Exemplary Modification

Exemplary Modification of Slideshow

Figure 19:
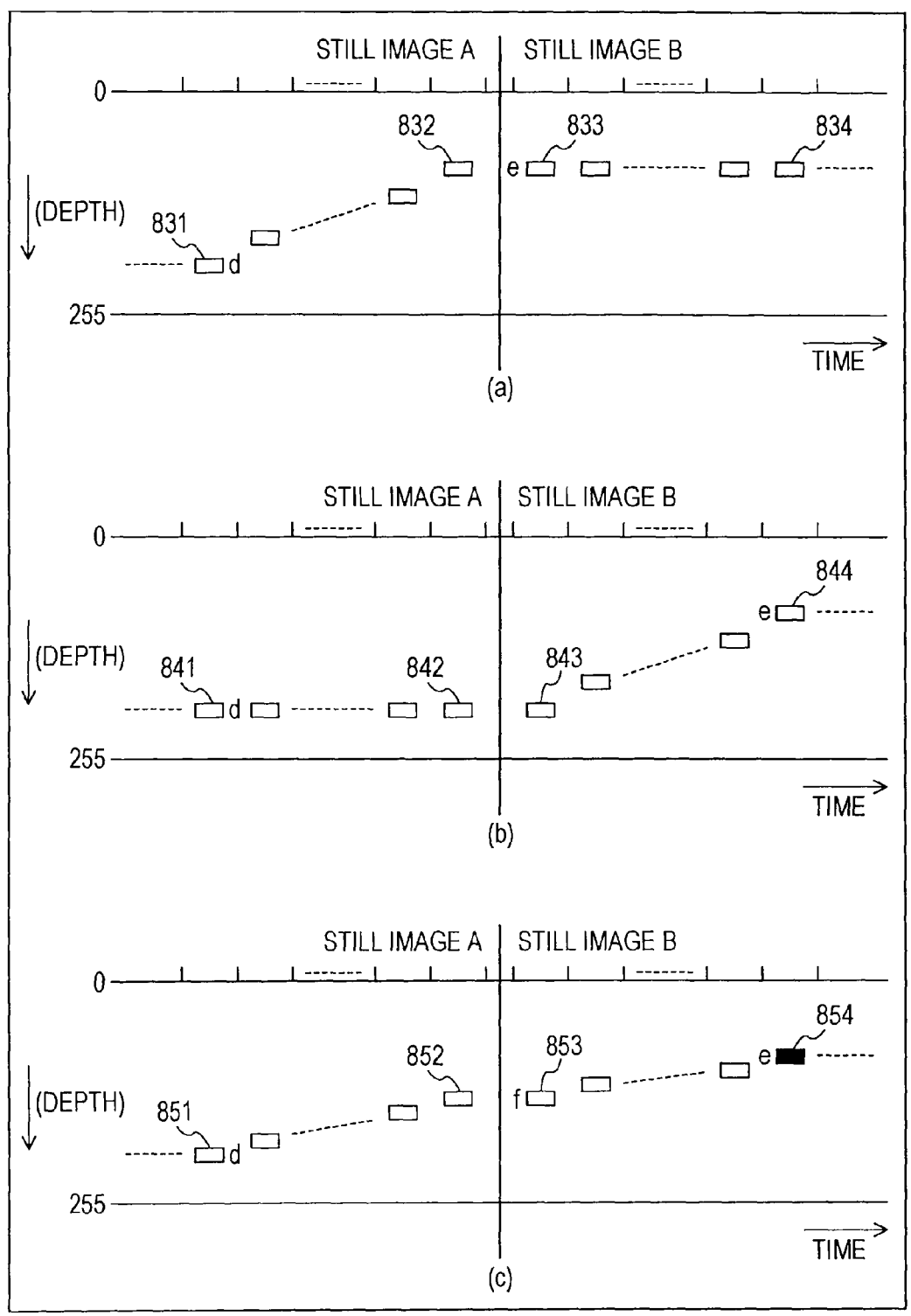
FIG. 19 includes diagrams illustrating an exemplary modification of the third mode of depth value correction according to the embodiment of the present invention.

FIG. 19 includes diagrams illustrating an exemplary modification of the third mode of depth value correction according to the embodiment of the present invention. In the third mode described above, a depth value is maintained at a constant value. In this exemplary modification, however, similarly to the second mode, it is assumed that a depth value is allowed to transition before and after a scene change.

Part (a) of FIG. 19 illustrates an example in which a depth value is allowed to transition only in the end portion of a still image. That is, in this example, a depth value 831 is allowed to transition to a depth value 832 in the end portion of a still image A, and, in the start portion of a still image B, a constant value is maintained from a depth value 833 to a depth value 834.

Part (b) of FIG. 19 illustrates an example in which a depth value is allowed to transition only in the start portion of a still image. That is, in this example, a constant value is maintained from a depth value 841 to a depth value 842 in the end portion of a still image A, and a depth value 843 is allowed to transition to a depth value 844 in the start portion of a still image B.

Part (c) of FIG. 19 illustrates an example in which a depth value is allowed to transition both in the start portion and end portion of a still image. That is, in this example, a depth value 851 is allowed to transition to a depth value 852 in the end portion of a still image A, and a depth value 853 is also allowed to transition to a depth value 854 in the start portion of a still image B.

In this manner, in a case in which a depth value is allowed to transition, the transition may be performed in any period before and after a change between still images.

In order to implement such a transition of a depth value, the functional configuration described with reference to FIG. 11 and the processes described with reference to FIGS. 12 to 14 can be utilized. That is, moving image data in a slideshow format has frames each composed of still image data, but is not different from general moving image data when viewed as a whole. Therefore, the second embodiment of the present invention described above can be utilized. Similarly, entire depth values may be temporarily corrected to zero (infinity) on the occasion of the change between still images using the second embodiment of the present invention.

Furthermore, here, description has been given in the context of a scene change of a stereoscopic image. However, it goes without saying that an application to the change from a stereoscopic image to a planar image or the change from a planar image to a stereoscopic image can also be made in a similar manner. Furthermore, it goes without saying that an application to a case where, in moving image data having both moving image data in a slideshow format based on still images and normal moving image data, the change between a still image and a moving image can also be made in a similar manner.

In this manner, according to the embodiments of the present invention, a depth value can be allowed to smoothly transition in the scene change of stereoscopic content.

It is to be noted that the embodiments of the present invention illustrate examples for embodying the present invention, and have correspondences with, as described above, the matters specifying the invention set forth in the claims. However, the present invention is not intended to be limited to the embodiments, and a variety of modifications can be made without departing from the scope of the present invention.

Furthermore, the processing procedures described in the embodiments of the present invention may be regarded as a method having the above series of procedures, or may be regarded as a program for causing a computer to execute the above series of procedures or as a recording medium storing the program. The recording medium may be implemented using, in addition to an optical disc, a hard disk, and a semiconductor disk, for example, a CD (Compact Disc), an MD (Mini Disc), a DVD (Digital Versatile Disk), a memory card, a Blu-ray Disc (registered trademark), or the like. Further, in FIG. 2, video depth map values corresponding to GOPs for MPEG compression, which are recorded as video and audio streams, have been described. These values can be used for individual video and audio compressed streams such as, for example, a program stream of an optical disc, a TS stream used in the Blu-Ray standard or AVCHD standard, an MPEG2 stream, an H.264/AVC stream, and an MP4 stream, and future extension standards thereof.

REFERENCE SIGNS LIST

- 110 content supply unit
- 120 content read management unit
- 121 current frame number holding unit
- 122 current frame depth value holding unit
- 123 reference depth value specifying unit
- 130 number-of-transition-frames setting unit
- 140 content pre-read management unit
- 141 scene change detection unit
- 142 last frame number generation unit
- 143 target depth value generation unit
- 150 depth value correction unit
- 160 start depth value holding unit
- 170 fixed depth value setting unit
- 200 content recording unit
- 210 video data
- 220 depth map
- 300 image capture apparatus
- 310 lens unit
- 311 zoom lens
- 312 focus lens
- 315, 316, 346 motor
- 319 motor driver
- 321 image pickup element
- 322 analog processing unit
- 323 A/D converter
- 324 digital processing unit
- 325 timing generator
- 329 camera control unit
- 331 video encoding unit
- 332 depth information setting unit
- 333 file generation unit
- 334 file decoding unit
- 335 video decoding unit
- 336 depth information output unit
- 337 memory
- 338 memory controller
- 339 system control unit
- 341 error correction unit
- 342 data modulation/demodulation unit
- 343 magnetic field modulation driver
- 344 magnetic field head
- 345 servo circuit
- 347 optical pickup
- 349 drive control unit
- 350 display unit
- 370 optical disc
- 390 operation receiving unit

The invention claimed is:

1. An image information processing apparatus comprising:
circuitry configured to:
detect a scene change in content; and
correct a depth value for stereoscopic display so as to allow a change of the depth value to transition at a predetermined display speed before and after the scene change by multiplying the depth value by a depth correction factor,
wherein the depth correction factor is proportional to a number of frames whose depth is to be corrected,
wherein the depth value has a linear relationship with a logarithmic value of a distance, and
wherein the distance is a distance from a lens to an object in the content.

2. The image information processing apparatus according to claim 1,
wherein the circuitry is configured to correct a depth value corresponding to a certain area in the content so as to allow a change of the depth value to transition at a predetermined display speed before and after the scene change.

3. The image information processing apparatus according to claim 1,
wherein the circuitry is configured to correct a depth value of an entire image to a telephoto side before and after the scene change.

4. The image information processing apparatus according to claim 1,
wherein the circuitry is configured to correct the depth value so as to provide a transition from a depth value before the scene change to a depth value after the scene change at a predetermined display speed.

5. The image information processing apparatus according to claim 1,
wherein the circuitry is configured to perform correction so as to allow a depth value to transition in a predetermined period before the scene change.

6. The image information processing apparatus according to claim 1,
wherein the circuitry is configured to perform correction so as to allow a depth value to transition in a predetermined period after the scene change.

7. The image information processing apparatus according to claim 1,
wherein the circuitry is configured to perform correction so as to allow a depth value to transition in a predetermined period over before and after the scene change.

8. The image information processing apparatus according to claim 1,
wherein the circuitry is configured to detect, as the scene change, a change between a stereoscopic image and a planar image.

9. The image information processing apparatus according to claim 1,
wherein the circuitry is configured to detect, as the scene change, a change between a moving image and a still image.

10. An image information processing apparatus comprising:
 circuitry configured to:
 set a constant value as a fixed depth value for a depth value for providing stereoscopic display of image data forming content;
 select a certain area in the image data and that specifies, as a reference depth value, a depth value corresponding to the area; and
 correct a depth value corresponding to each area of the image data including at least a plurality of frames using a depth correction value which is a ratio of the reference depth value to the fixed depth value,
 wherein the depth value correction unit multiplies a depth value of each of the plurality of frames by the same depth correction value,
 wherein the depth value has a linear relationship with a logarithmic value of a distance, and
 wherein the distance is a distance from a lens to an object in the content.

11. An image capture apparatus comprising:
 circuitry configured to:
 capture an image and that supplies the captured image and a depth value for stereoscopic display;
 detect a scene change in the captured image; and
 correct the depth value so as to allow a change of the depth value to transition at a predetermined display speed before and after the scene change by multiplying the depth value by a depth correction factor,
 wherein the depth correction factor is proportional to a number of frames whose depth is to be corrected, and
 wherein the depth value has a linear relationship with a logarithmic value of a distance, and
 wherein the distance is a distance from a lens to an object in the content.

12. An image information processing method comprising:
 a scene change detecting procedure of detecting a scene change in content; and
 a depth value correcting procedure of correcting a depth value for stereoscopic display so as to allow a change of the depth value to transition at a predetermined display speed before and after the scene change by multiplying the depth value by a depth correction factor,
 wherein the depth correction factor is proportional to a number of frames whose depth is to be corrected,
 wherein the depth value has a linear relationship with a logarithmic value or a distance, and
 wherein the distance is a distance from a lens to an object in the content.

13. A non-transitory computer readable medium storing a program, which when executed, causes a computer to execute:
 a scene change detecting procedure of detecting a scene change in content; and
 a depth value correcting procedure of correcting a depth value for stereoscopic display so as to allow a change of the depth value to transition at a predetermined display speed before and after the scene change by multiplying the depth value by a depth correction factor,
 wherein the depth correction factor is proportional to a number of frames whose depth is to be corrected,
 wherein the depth value has a linear relationship with a logarithmic value of a distance, and
 wherein the distance is a distance from a lens to an object in the content.

14. The image information processing apparatus according to claim 1,
 wherein the content includes a plurality of frames before and after the scene change, and
 circuitry is configured to multiply a depth value of a frame of the plurality of frames by a corresponding depth correction factor.

15. The image information processing apparatus according to claim 14,
 wherein a number of the plurality of frames before the scene change is equal to a number of the plurality of frames after the scene change.

16. The image information processing apparatus according to claim 14,
 wherein each of the corresponding depth correction factors are proportional to a number of frames whose depth is to be corrected.

17. The image information processing apparatus according to claim 16,
 wherein each of the corresponding depth correction factors is different from the others.

18. The image information processing apparatus according to claim 16,
 wherein each of the corresponding depth correction factors is different from the others based upon a position of the frame with respect to the scene change.

19. The image information processing apparatus according to claim 1,
 wherein the depth value correction unit corrects a depth value of an entire image to zero before and after the scene change.

* * * * *